(12) United States Patent
Chadha et al.

(10) Patent No.: US 10,621,523 B1
(45) Date of Patent: Apr. 14, 2020

(54) COMPUTER METHODS AND COMPUTER SYSTEMS FOR FACILITATING BUSINESS RULE GENERATION AND VALIDATION

(71) Applicants: Parvinder Chadha, Dallas, TX (US);
Xin Cheng, San Diego, CA (US);
Sanjay Kulkarni, Dallas, TX (US)

(72) Inventors: Parvinder Chadha, Dallas, TX (US);
Xin Cheng, San Diego, CA (US);
Sanjay Kulkarni, Dallas, TX (US)

( * ) Notice: Subject to any disclaimer, the term of this patent is extended or adjusted under 35 U.S.C. 154(b) by 0 days.

(21) Appl. No.: 16/054,665

(22) Filed: Aug. 3, 2018

Related U.S. Application Data

(63) Continuation of application No. 15/633,281, filed on Jun. 26, 2017, now abandoned, which is a continuation of application No. 15/239,439, filed on Aug. 17, 2016, now abandoned, which is a continuation of application No. 14/577,111, filed on Dec. 19, 2014, now abandoned, which is a continuation of application No. 13/891,073, filed on May 9, 2013, now abandoned.

(60) Provisional application No. 61/644,787, filed on May 9, 2012.

(51) Int. Cl.
  *G06Q 10/06* (2012.01)
  *G06F 11/34* (2006.01)
  *G06F 11/36* (2006.01)
  *G06F 8/33* (2018.01)

(52) U.S. Cl.
  CPC ........ *G06Q 10/06311* (2013.01); *G06F 8/33* (2013.01); *G06F 11/3466* (2013.01); *G06F 11/3668* (2013.01); *G06Q 10/0639* (2013.01)

(58) Field of Classification Search
  CPC ..... G06F 11/3668; G06F 11/3466; G06F 8/33
  See application file for complete search history.

(56) References Cited

U.S. PATENT DOCUMENTS

| | | | | |
|---|---|---|---|---|
| 6,662,172 | B1 * | 12/2003 | Smith | G06F 17/50 345/581 |
| 7,603,358 | B1 * | 10/2009 | Anderson | G06F 21/6218 |
| 9,817,677 | B2 * | 11/2017 | Pessoa | G06F 9/4492 |
| 2002/0049961 | A1 * | 4/2002 | Fang | G06F 8/34 717/127 |
| 2003/0191667 | A1 * | 10/2003 | Fitzgerald | G06Q 10/10 705/2 |

(Continued)

*Primary Examiner* — Phillip H Nguyen
(74) *Attorney, Agent, or Firm* — Seyfarth Shaw LLP; Puya Partow-Navid

(57) ABSTRACT

In some embodiments, the instant invention includes a method that includes: specifically programming a computer system to perform: receiving a plurality of conditions and a plurality of actions; determining a rule by a rule engine based on the plurality of conditions and the plurality of actions; where the rule is designed to operate in a computer program and where the computer program is operationally distinct from the rule engine; dynamically validating, by the rule engine, the rule for a deployment in the computer program, where the dynamically validating includes: evaluating the rule based on a plurality of rule features, where each rule feature is associated with a weighting factor identifying a requirement level applicable to each rule feature, and testing a performance of the rule based on test data related to the computer program; and deploying the rule into the computer program after the rule having been validated.

12 Claims, 33 Drawing Sheets

(56) References Cited

U.S. PATENT DOCUMENTS

| | | | | |
|---|---|---|---|---|
| 2004/0128229 | A1* | 7/2004 | Raines | G06Q 40/00 |
| | | | | 705/38 |
| 2005/0015264 | A1* | 1/2005 | Mutchler | G06Q 10/0631 |
| | | | | 705/7.12 |
| 2005/0264581 | A1* | 12/2005 | Patrick | H04L 65/4076 |
| | | | | 345/594 |
| 2007/0006190 | A1* | 1/2007 | Surasinghe | G06F 8/30 |
| | | | | 717/143 |
| 2007/0094199 | A1* | 4/2007 | Deshpande | G06N 5/025 |
| | | | | 706/47 |
| 2007/0174223 | A1* | 7/2007 | Holmes | G06N 5/025 |
| | | | | 706/47 |
| 2007/0239570 | A1* | 10/2007 | Kam-Chak Cheng | |
| | | | | G06Q 10/10 |
| | | | | 705/35 |
| 2009/0271214 | A1* | 10/2009 | Kandasamy | G06Q 10/00 |
| | | | | 705/2 |

\* cited by examiner

COMPUTER METHODS AND COMPUTER SYSTEMS FOR FACILITATING BUSINESS RULE GENERATION AND VALIDATION

RELATED APPLICATIONS

This application is a continuation of U.S. patent application Ser. No. 14/577,111, filed Dec. 19, 2014, entitled "COMPUTER METHODS AND COMPUTER SYSTEMS FOR FACILITATING BUSINESS RULE GENERATION AND VALIDATION", which is a continuation of U.S. patent application Ser. No. 13/891,073, filed May 9, 2013, entitled "COMPUTER METHODS AND COMPUTER SYSTEMS FOR FACILITATING BUSINESS RULE GENERATION AND VALIDATION" which claims the priority of U.S. Patent Appln. No. 61/644,787; filed May 9, 2012; entitled "COMPUTER METHODS AND COMPUTER SYSTEMS FOR FACILITATING BUSINESS RULE GENERATION AND VALIDATION," which are incorporated herein by reference in their entirety for all purposes.

TECHNICAL FIELD

In some embodiments, the instant invention is related to computer methods/systems that facilitate business rule generation and validation in various settings: e.g., but not limited to, managing the performance of company's business processes, managing the performance of organizational tasks, managing the performance of administrative duties, etc.

BACKGROUND

Typically, a computer programmer writes a computer code that embodies business rules so that when a computer program is executed, the computer program performs in accordance with those rules. Typically, when the rules need to be changed, the computer programmer changes computer codes within the computer program to reflect the change in the business rules. Typically, the computer programmer tests the new computer code within the computer program environment to determine if he or she coded the changes correctly and/or the coded business rules performed as designed.

SUMMARY OF INVENTION

In some embodiments, the instant invention includes a computer-implemented method that includes at least: specifically programming at least one computer system to perform at least the following: receiving a first plurality of conditions and a second plurality of actions; determining at least one first rule by at least one first rule engine based, at least in part, on the first plurality of conditions and the second plurality of actions; where the at least one first rule is designed to operate in at least one first computer program and where the at least one first computer program is operationally distinct from the at least one first rule engine; dynamically validating, by the at least one first rule engine, the at least one first rule for a deployment in the at least one first computer program, where the dynamically validating at least includes: evaluating the at least one first rule based, at least in part, on a third plurality of rule features, where each rule feature is associated with a weighting factor identifying a requirement level applicable to each rule feature, and testing a first performance of the at least one first rule based, at least in part, on test data related to the at least one first computer program; and deploying the at least one first rule into the at least one first computer program after the at least one first rule having been validated.

In some embodiments, the testing the performance of the at least one first rule further includes at least: comparing the first performance of the at least one first rule to a second performance of the at least one first rule, where in the second performance represents a historical performance of the at least one first rule.

In some embodiments, the testing the performance of the at least one first rule further includes at least: performing a regression testing of the at least one first rule.

In some embodiments, the testing the performance of the at least one first rule further includes at least: performing a file-wise testing of the at least one first rule.

In some embodiments, the deploying the at least one first rule into the at least one first computer program includes at least: adapting the at least one first rule to serve a group of objects related to at least one first business process.

In some embodiments, the group of objects are in at least one second computer program, where the at least one first and the at least one second computer programs are related to the at least one first business process. In some embodiments, at least one first object of the group of objects is a lookup field.

In some embodiments, the instant invention includes a computer system that at least includes the following components: a non-transient memory having at least one region for storing computer executable program code; and at least one processor for executing the program code stored in the memory, where the program code at least includes: code to receive a first plurality of conditions and a second plurality of actions; code to determine at least one first rule by at least one first rule engine based, at least in part, on the first plurality of conditions and the second plurality of actions; where the at least one first rule is designed to operate in at least one first computer program and where the at least one first computer program is operationally distinct from the at least one first rule engine; code to dynamically validate, by the at least one first rule engine, the at least one first rule for a deployment in the at least one first computer program, where the code to dynamically validate the at least one first rule includes at least: code to evaluate the at least one first rule based, at least in part, on a third plurality of rule features, where each rule feature is associated with a weighting factor identifying a requirement level applicable to each rule feature, and code to test a first performance of the at least one first rule based, at least in part, on test data related to the at least one first computer program; and code to deploy the at least one first rule into the at least one first computer program after the at least one first rule having been validated.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 17:
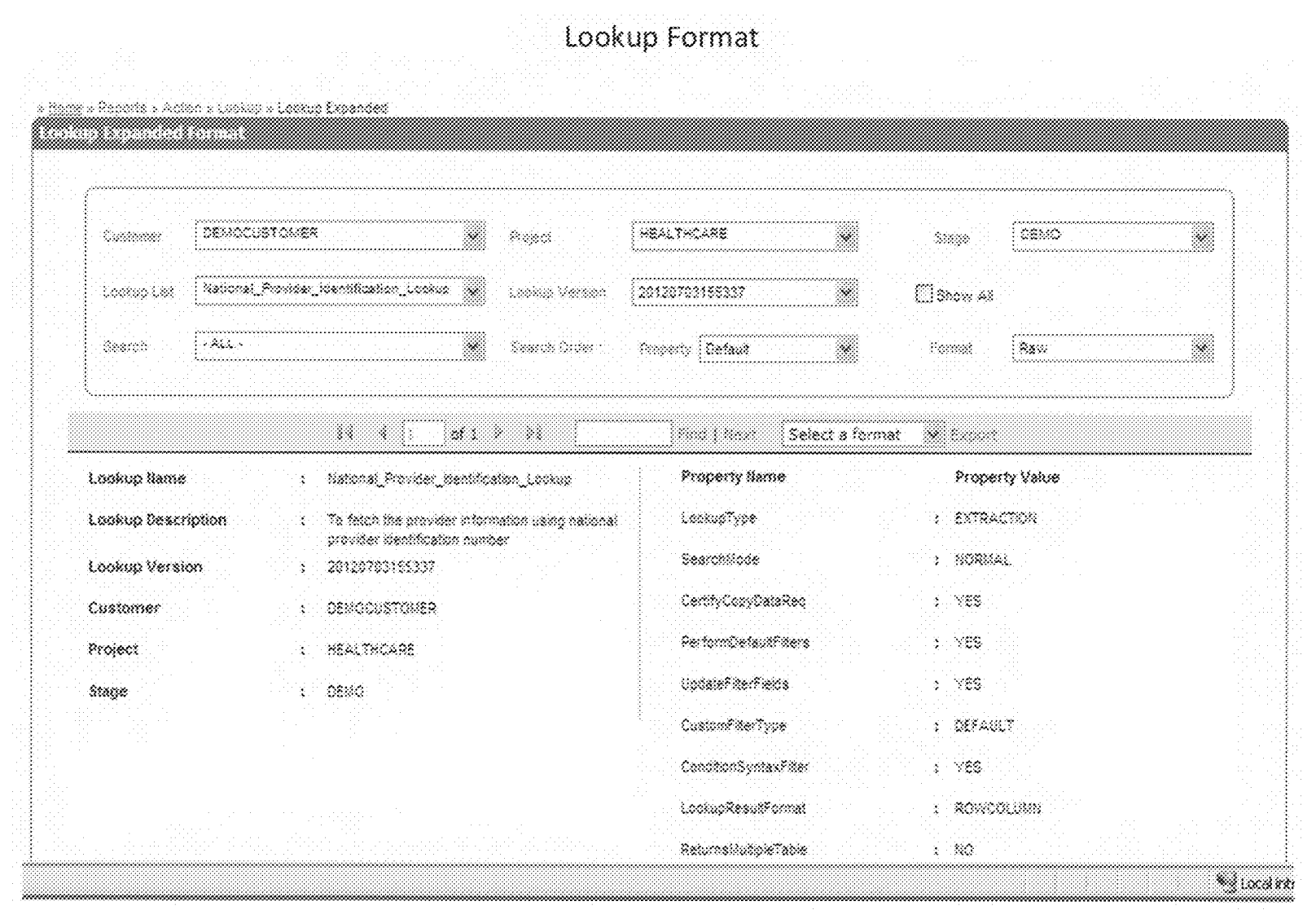

FIG. 17 identifies some exemplary features in accordance with some embodiments of the present invention.

Figure 18:
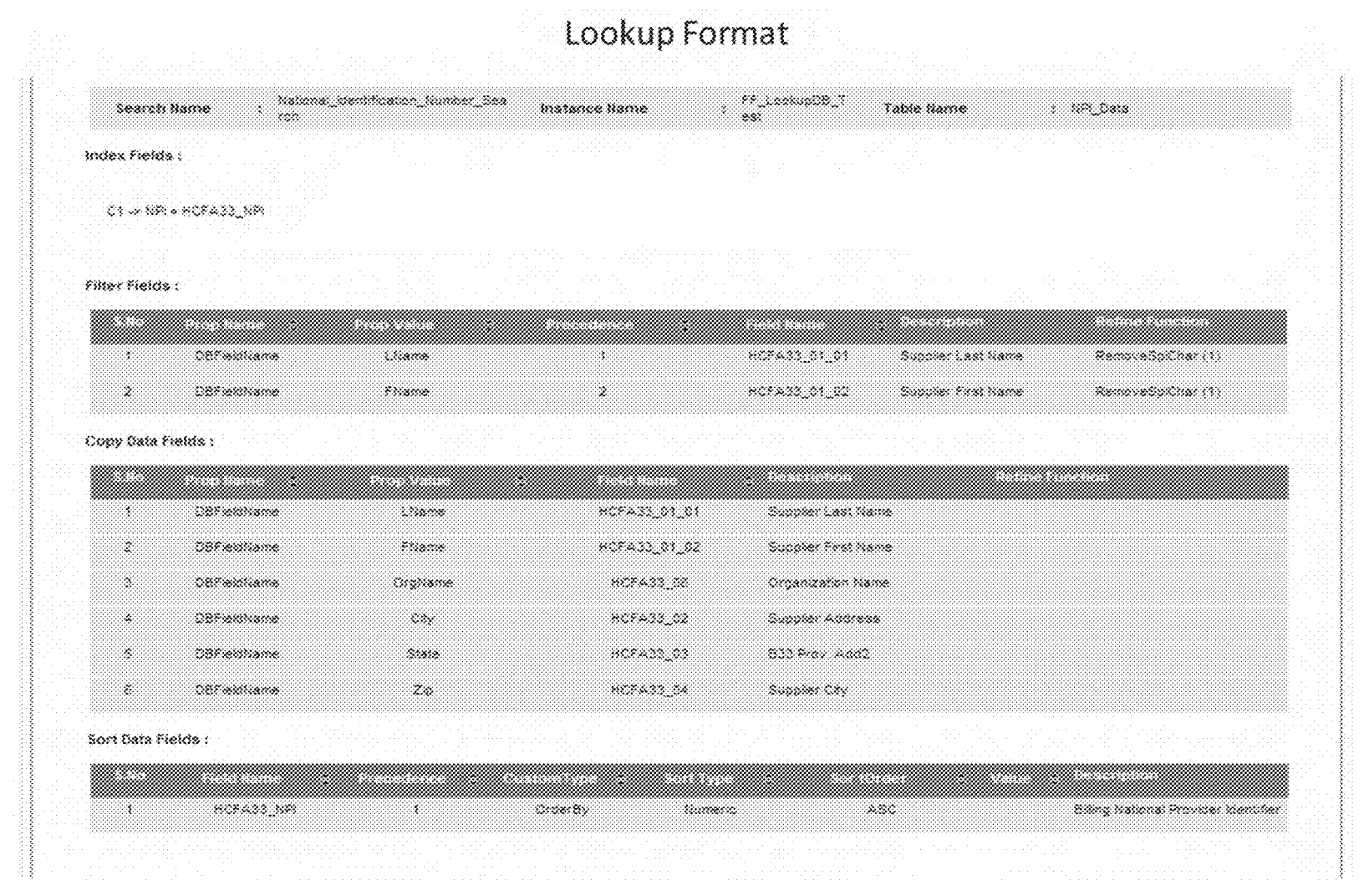

FIG. 18 identifies some exemplary features in accordance with some embodiments of the present invention.

FIG. 23 identifies some exemplary features in accordance with some embodiments of the present invention.

Figure 1:
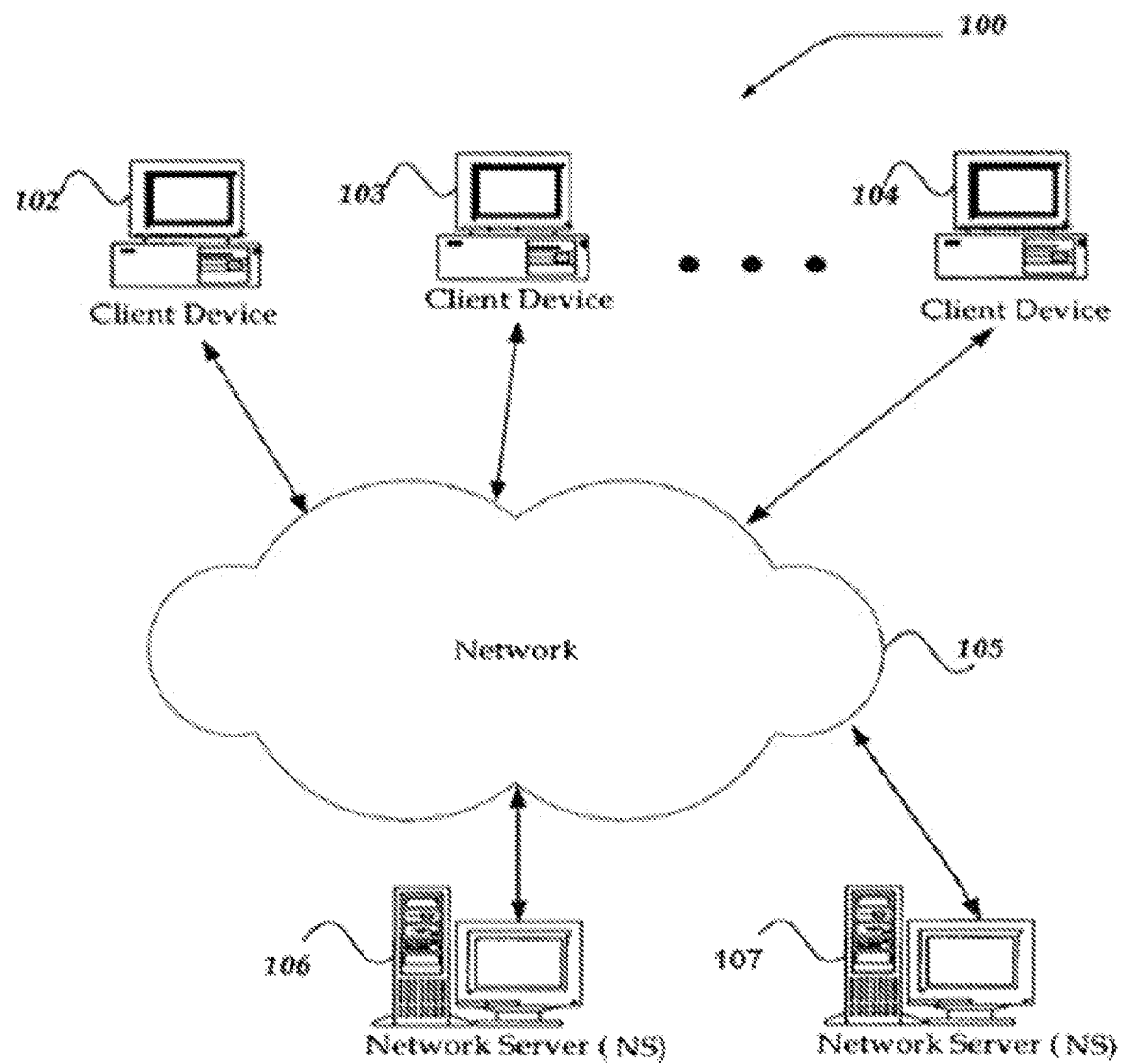
FIG. 1 illustrates a computer system in accordance with some embodiments of the present invention.

The figures constitute a part of this specification and include illustrative embodiments of the present invention and illustrate various objects and features thereof. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In addition, as used herein, the terms "real time" means without undue delay and to be performed within a single time communication session while participants in a workflow management transacting with or through at least some embodiments of the computer systems of the instant invention.

It is understood that at least one aspect/functionality of various embodiments described herein can be performed in real-time and dynamically. As used herein, the term "real-time" means that an event/action can occur instantaneously or almost instantaneously in time when another event/action has occurred. For example, in some embodiments, an event occurs in real-time if a time difference between a first time when a first action is taken and a second action is no more than 1 minute. In some embodiments, an event occurs in real-time if a time difference between a first time when a first action is taken and a second action is no more than 1 second. In some embodiments, the time difference between the first action and the second subsequent action is between less than 1 second and 1 minute.

As used herein, the term "dynamic(ly)" means that an event/action that can occur without any human intervention. The event/action may be in real-time and/or hourly, daily, weekly and/or monthly.

Illustrative Operating Environments for Some Embodiments of the Instant Invention

Example 1

FIG. 1 illustrates a computer system in accordance with some embodiments of the present invention. However, not all of these components may be required to practice the invention, and variations in the arrangement and type of the components may be made without departing from the spirit or scope of the invention. In some embodiment, the inventive transaction system hosts a large number of members and concurrent transactions. In other embodiments, the inventive transaction computer system is based on a scalable computer and network architecture that incorporates varies strategies for assessing the data, caching, searching, and database connection pooling. An example of the scalable architecture is an architecture that is capable of operating multiple servers. In some embodiments, the computing system in accordance with the instant invention may include, but not limiting to, one or more programmed computers, systems employing distributed networking, or other type of system that might be used to transmit and process electronic data.

In some embodiments, client devices 102-104 participating in an exemplary rule management include virtually any computing device capable of receiving and sending a message over a network, such as network 105, to and from another computing device, such as rule management servers 106 and 107, each other, and the like. In some embodiments, the set of such devices includes devices that typically connect using a wired communications medium such as personal computers, multiprocessor systems, microprocessor-based or programmable consumer electronics, network PCs, and the like. In some embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in some embodiments, client devices 102-104 are any device that is capable of connecting using a wired or wireless communication medium such as a PDA, POCKET PC, smart phone, wearable computer, and any other device that is equipped to communicate over a wired and/or wireless communication medium.

In some embodiments, each client device within client devices 102-104 includes a browser application that is configured to receive and to send web pages, and the like. In some embodiments, the browser application is configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, .Net and the like.

In some embodiments, client devices 102-104 are further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In some embodiments, network 105 is configured to couple one computing device to another computing device to enable them to communicate. In some embodiments, network 105 is enabled to employ any form of computer readable media for communicating information from one electronic device to another. Also, In some embodiments, network 105 includes a wireless interface, and/or a wired interface, such as the Internet, in addition to local area networks (LANs), wide area networks (WANs), direct connections, such as through a universal serial bus (USB) port, other forms of computer-readable media, or any combination thereof. In some embodiments, on an interconnected set of LANs, including those based on differing architectures and protocols, a router acts as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, In some embodiments, remote computers and other related electronic devices could be remotely connected to either LANs or WANs via a modem and temporary telephone link. In essence, In some embodiments, network 105 includes any communication method by which information may travel between client devices 102-104, and servers 106 and 107.

Example 2

Figure 2:
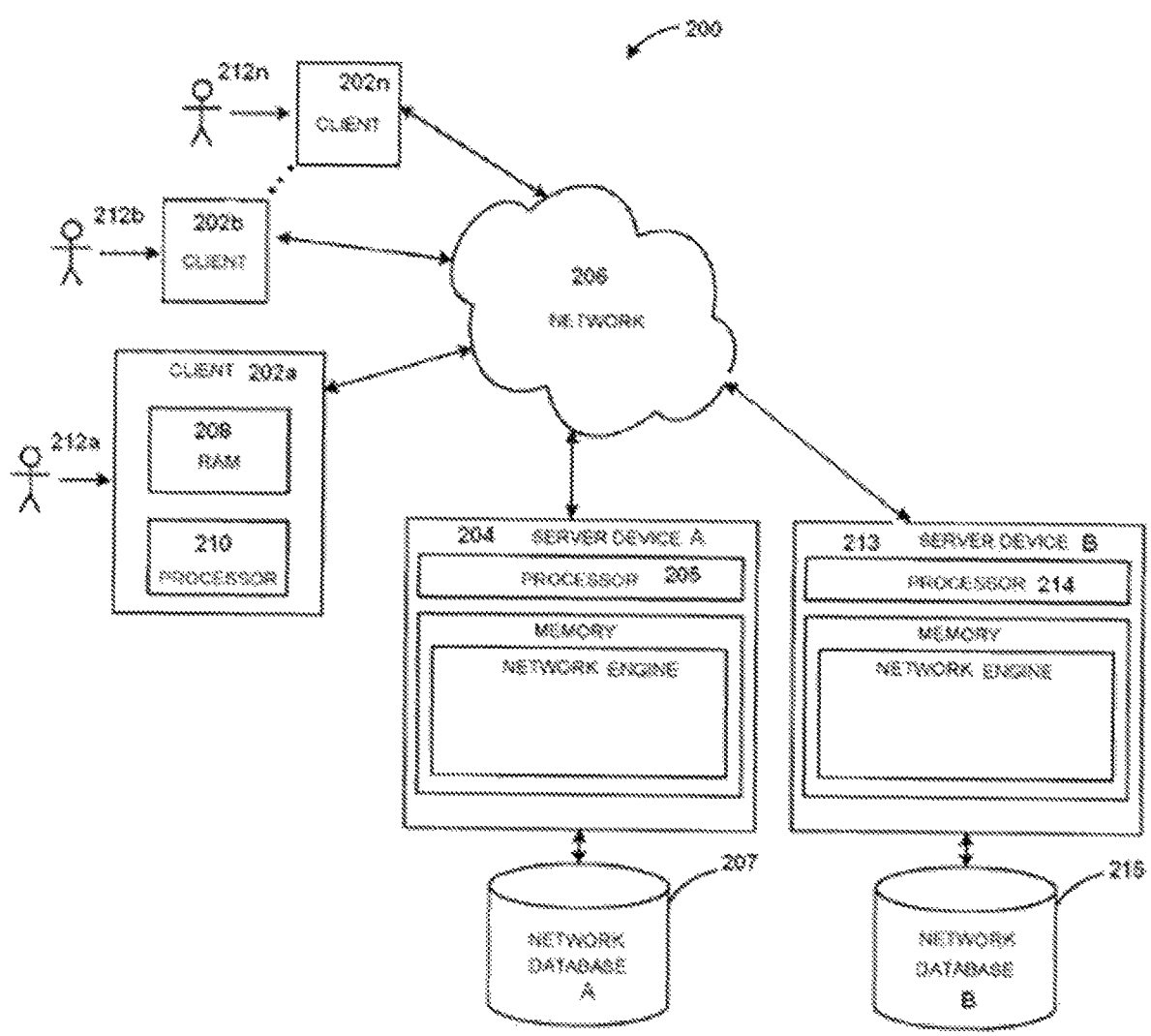
FIG. 2 illustrates a computer system in accordance with some embodiments of the present invention.

FIG. 2 shows another exemplary embodiment of the transaction computer and network architecture that supports a computer system in accordance with some embodiments of the instant invention. The client devices participating in an exemplary rule 202*a*, 202*b* thru 202*n* shown each can include a computer-readable medium, such as a random access memory (RAM) 208 coupled to a processor 210. The processor 210 can execute computer-executable program instructions stored in memory 208. Such processors can comprise a microprocessor, an ASIC, and state machines. Such processors comprise, or are be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 210 of client 202*a*, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media transmit or carry instructions to a computer, including a router, private or public network, or other transmission device or channel, both wired and wireless. The instructions comprise code from any computer-programming language, including, for example, C, C++, C#, Visual Basic, Java, Python, Perl, and JavaScript.

Client devices 202*a-n* also comprise a number of external or internal devices such as a mouse, a CD-ROM, DVD, a keyboard, a display, or other input or output devices. Examples of client devices 202*a-n* can be personal computers, digital assistants, personal digital assistants, cellular phones, mobile phones, smart phones, pagers, digital tablets, laptop computers, Internet appliances, and other processor-based devices. In general, a client device 202*a* can be any type of processor-based platform that is connected to a network 206 and that interacts with one or more application programs. The client devices 202a-n can operate on any operating system capable of supporting a browser or browser-enabled application, such as Microsoft™, Windows™, or Linux.

The client devices 202a-n shown can include, for example, personal computers executing a browser application program such as Microsoft Corporation's Internet Explorer™, Apple Computer, Inc.'s Safari™, Mozilla Firefox, and Opera. Through the client devices 202a-n, participants 212a-n communicate over the network 206 with each other and with other systems and devices coupled to the network 206.

As shown in FIG. 2, exemplary rule management server devices 204 and 213 can be also coupled to the network 206.

In some embodiments, the instant invention can allow of participants in an exemplary rule to use Quick Response Codes (QR codes), including SPARQCode that is a matrix code (or two-dimensional bar code) encoding standard that is based on the physical QR Code), and/or near field communication devices ("NFC devices"), to communicate with computer systems of the instant invention.

In some embodiments, QR Codes can encode addresses and Uniform Resource Locators (URLs. In some embodiments, QR Codes may also be linked to a location to track where a code has been scanned. For example, either the application that scans the QR Code retrieves the geo information by using GPS and cell tower triangulation (aGPS) or the URL encoded in the QR Code itself is associated with a location. For example, the smart phone's browser that supports URI redirection, can allow QR Codes to send metadata to existing applications on the device.

In some embodiments, NFC can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiment, NFC can operates at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable device within close proximity of each other.

In some embodiments, NFC tags can contain data and be read-only or rewriteable. In some embodiment, NFC tags can be custom-encoded. In some embodiments, NFC tags and/or NFC-enabled device (e.g., smart phones with NFC capabilities) can securely store personal data.

In some embodiments, data may also be communicated using any wireless means of communication, such as 4G, 3G, GSM, GPRS, WiFi, WiMax, and other remote local or remote wireless communication using information obtained via the interfacing of a wireless NFC enabled mobile device to a smart poster. In some embodiments, the term "wireless communications" includes communications conducted at ISO 14443 and ISO 18092 interfaces. In some embodiments, the communications between participant's NFC-enabled smart device and provided equipment (e.g., terminals, POS, POE, Hosts) is performed, for example, in accordance with the ISO 14443A/B standard and/or the ISO 18092 standard.

In some embodiments, participant's NFC-enabled smart device and/or provided equipment (e.g., terminals, POS, POE, Hosts) can include one or more additional transceivers (e.g., radio, Bluetooth, and/or WiFi transceivers) and associated antennas, and enabled to communicate with each other by way of one or more mobile and/or wireless protocols.

In some embodiments, participant's NFC-enabled smart device may include a power source, an NFC circuit configured to wirelessly communicate using an NFC communications protocol, and a processor coupled to the power source and the NFC circuit. In some embodiments, the processor of participant's NFC-enabled smart device may be configured to synchronize an internal timing signal to an external timing signal, cycle power to the NFC circuit to periodically switch the NFC circuit between a peer-to-peer recognition state and a low power state based upon the synchronized internal timing signal, and initiate peer-to-peer NFC communications with another NFC device when in range thereof and upon being simultaneously switched to the peer-to-peer recognition state therewith.

Illustrative Methods and Systems of Some Embodiments of the Instant Invention

For purposes of describing the instant invention the following abbreviations, as used herein, apply:
BRE—Business Rule Engine
FCB—Field Control Block
MICR—Magnetic Ink Character Recognition
MIS—Management Information System
MQ—Message Queue
MSA—Multi Stage Adjudication
OCR—Optical Character Recognition
SDT—Simple Decision Table
TDT—Typical Decision Table In some embodiments, the instant invention offers a programming approach for problem solving by utilizing programmed business rules. One example of a business rule that can be programmed in accordance with principles of the instant invention can be a credit card rule to reward a customer for spending a predetermined amount at a particular store by offering a store discount. One example of a business rule that can be programmed in accordance with principles of the instant invention can be a rule for a collection agency that prevents a collection agent from calling people after 7 PM at night—this rule can use a time and zip code to determine whether to allow the collection agent to make the call or not.

In some embodiments, the instant invention offers code redundancy for the same business logic across different computer applications.

In some embodiments, the instant invention offers platform dependencies while integrating with legacy system.

In some embodiments, the instant invention offers application code maintenance.

In some embodiments, the instant invention offers to minimize development efforts required for creating/manipulating business logics.

In some embodiments, the instant invention offers to minimize risk/high impact on application for even a small business logic change.

Figure 3:
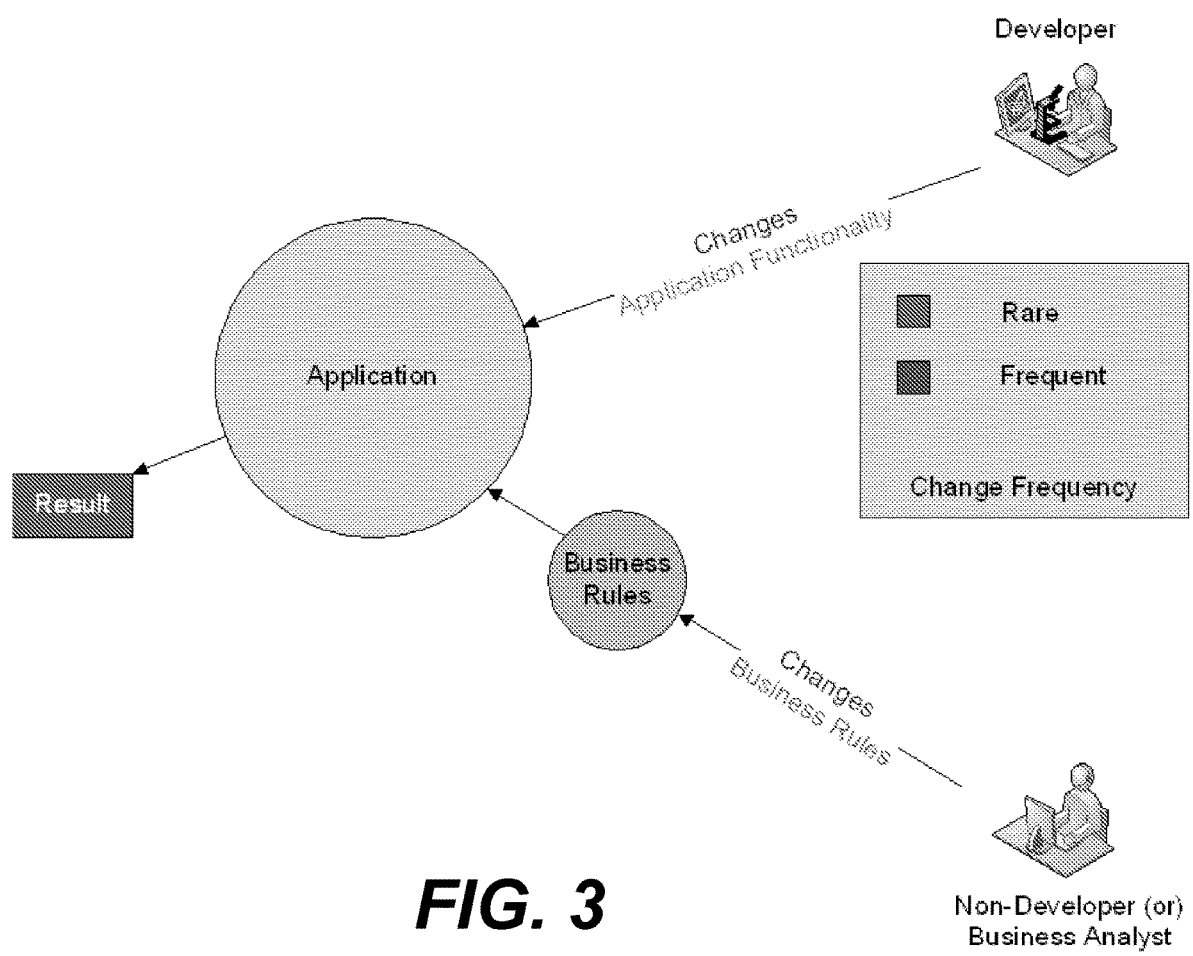
FIG. 3 identifies some exemplary features in accordance with some embodiments of the present invention.

In some embodiments, the instant invention separates business rules by using a business rule engine which is outside the application scope. In some embodiments, an impact to the application can be minimized in this approach. In some embodiments, the instant invention offers an interactive application for business rule configurations. In some embodiments, rule configurations can be handled by the domain experts like business analyst rather than a software programmer. In some embodiments, as shown in FIG. 3, the instant invention offers an individual rule and regression testing which is independent from an application in which the rules are used. In some embodiments, the instant invention offers to design and validation capabilities to test rules based on a single rule, a group of rules, and area/field levels. In some embodiments, the instant invention offers an automated (e.g., real-time, batch processing) performance of a regression testing by a computer system.

In some embodiments, the instant invention offers an ability to read business rules in multiple formats appropriate to business analyst, data analyst and developer.

Figure 6:
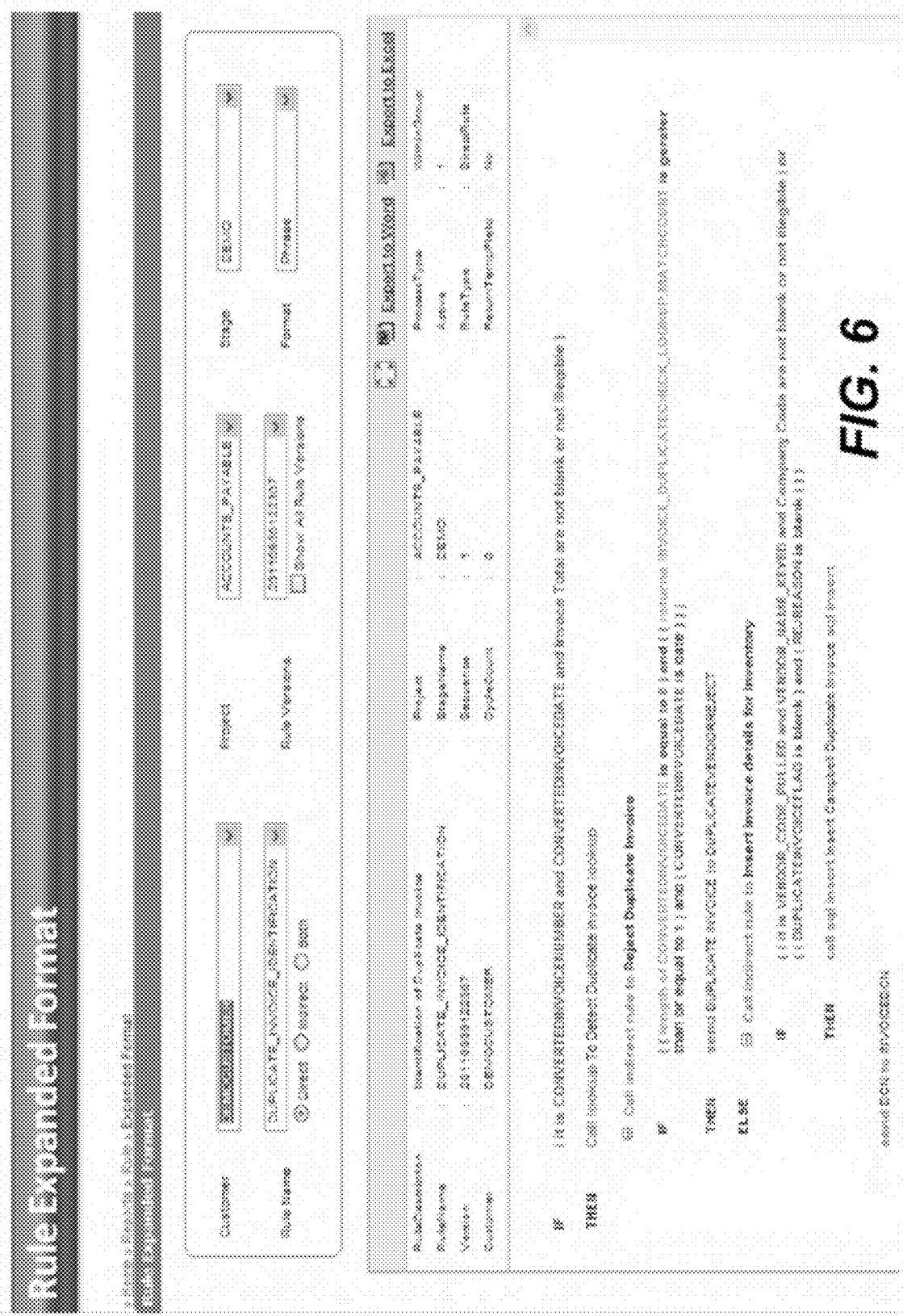
FIG. 6 identifies yet further exemplary features in accordance with some embodiments of the present invention.
Figure 7:
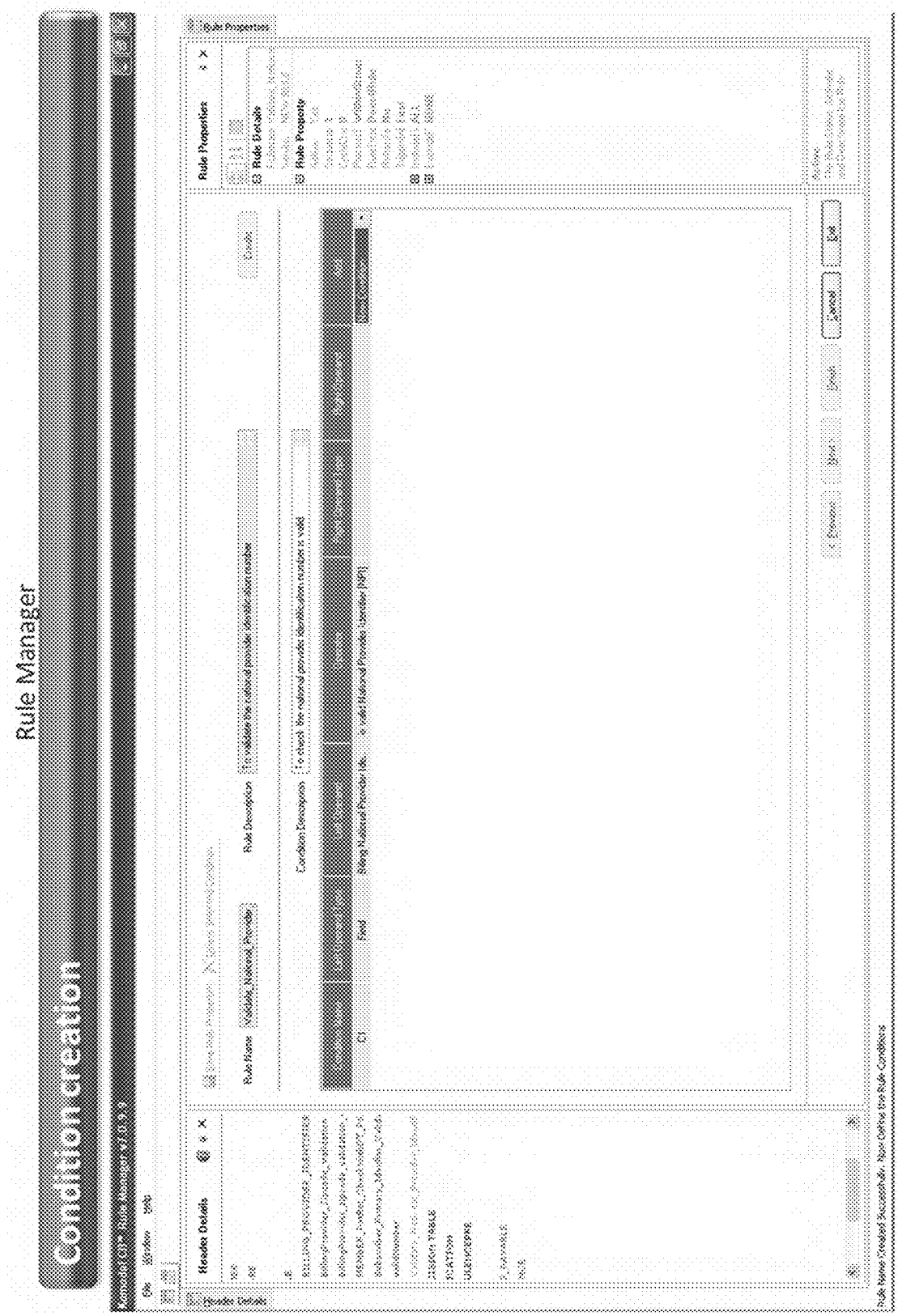
FIG. 7 identifies yet further exemplary features in accordance with some embodiments of the present invention.
Figure 8:
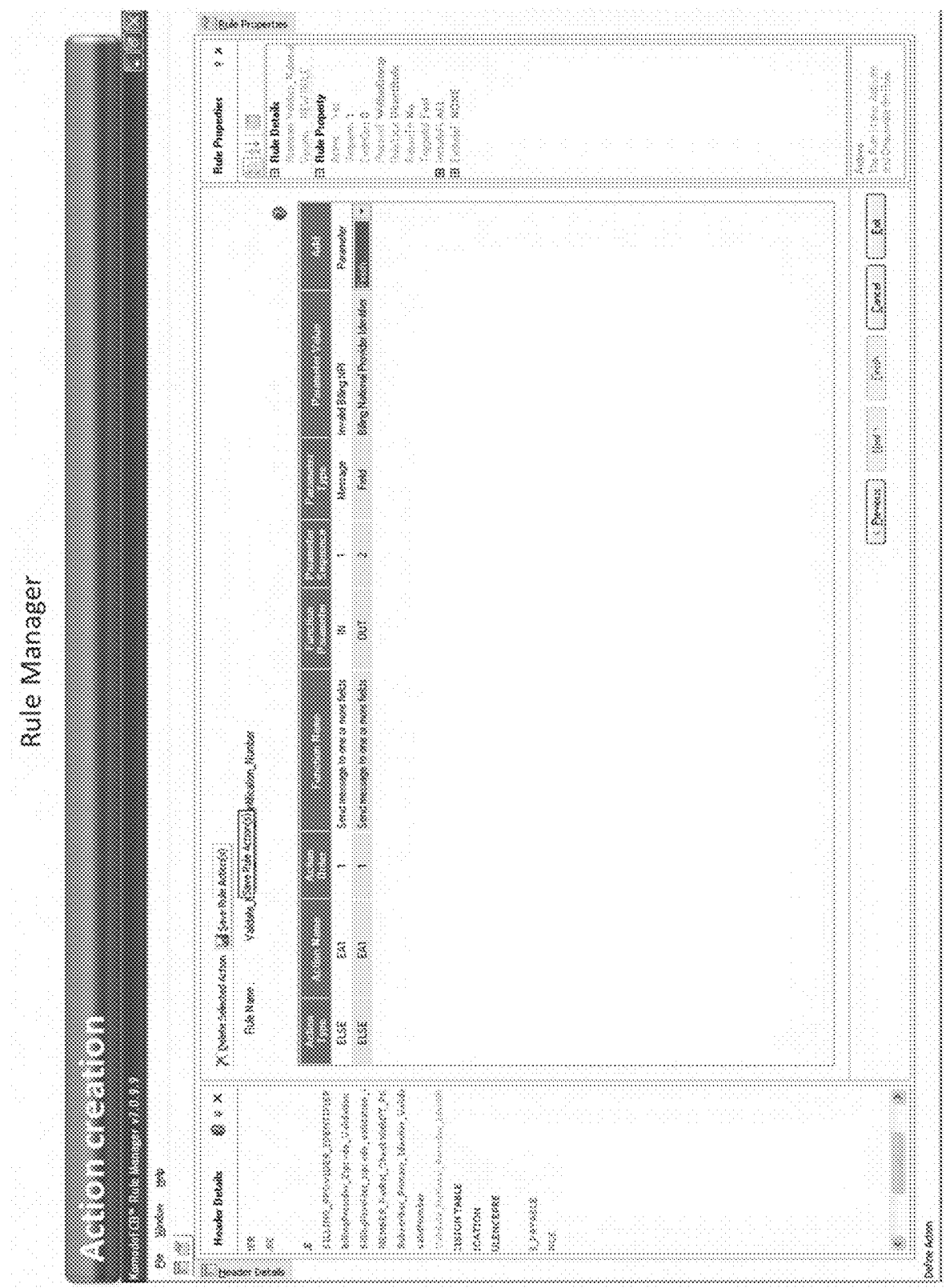
FIG. 8 identifies yet further exemplary features in accordance with some embodiments of the present invention.
Figure 9:
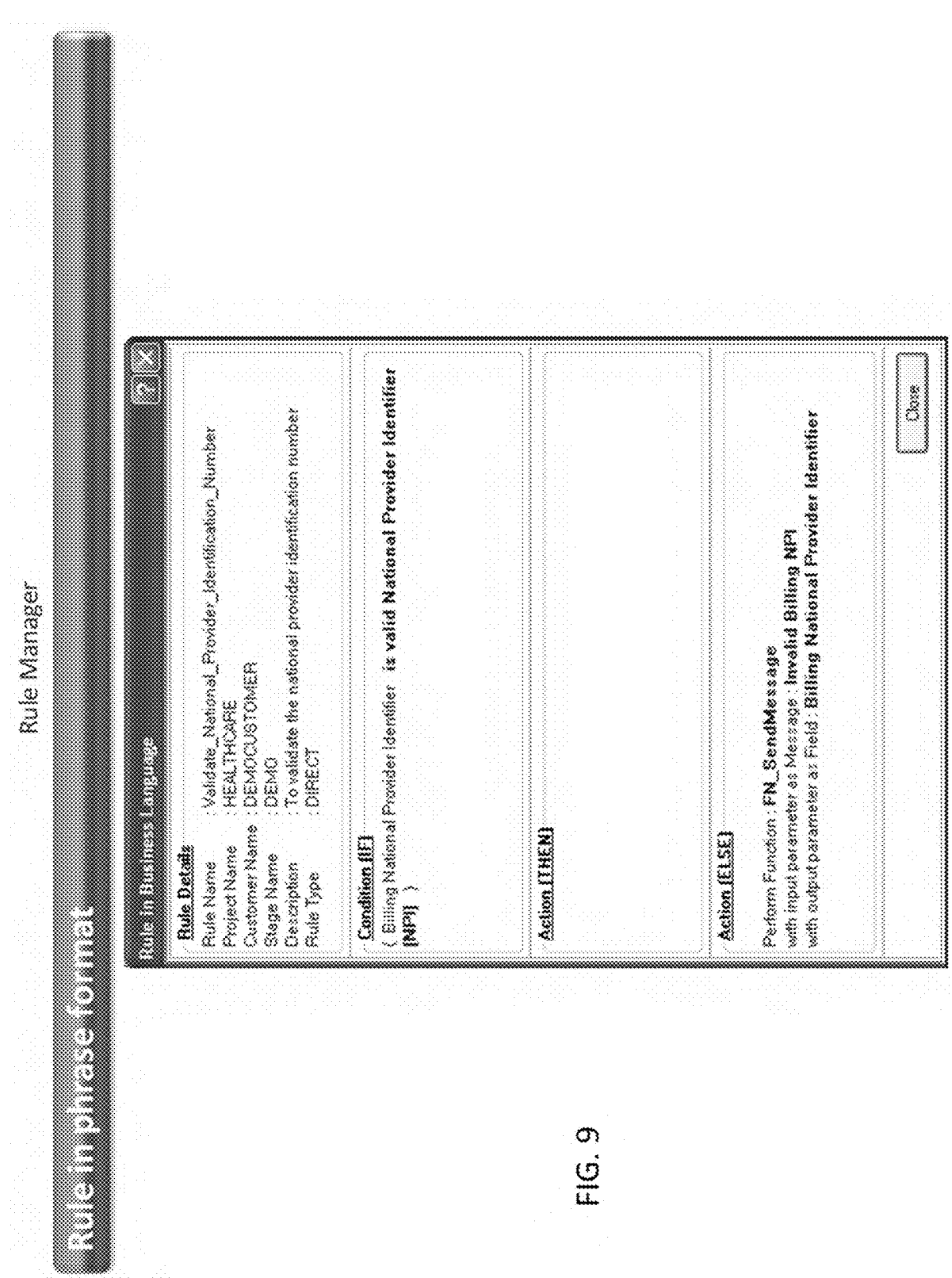
FIG. 9 identifies yet further exemplary features in accordance with some embodiments of the present invention.
Figure 10:
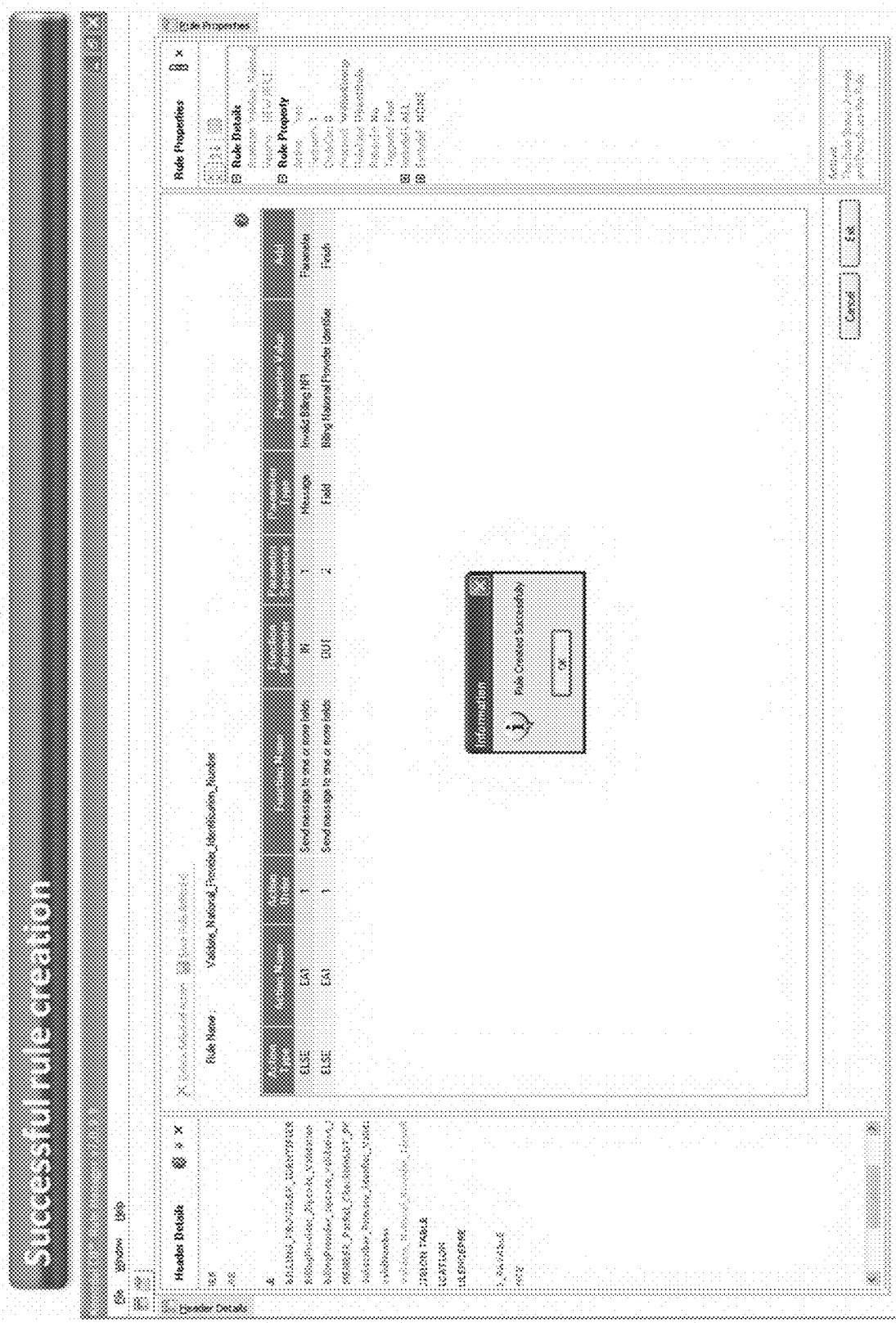
FIG. 10 identifies yet further exemplary features in accordance with some embodiments of the present invention.
Figure 11:
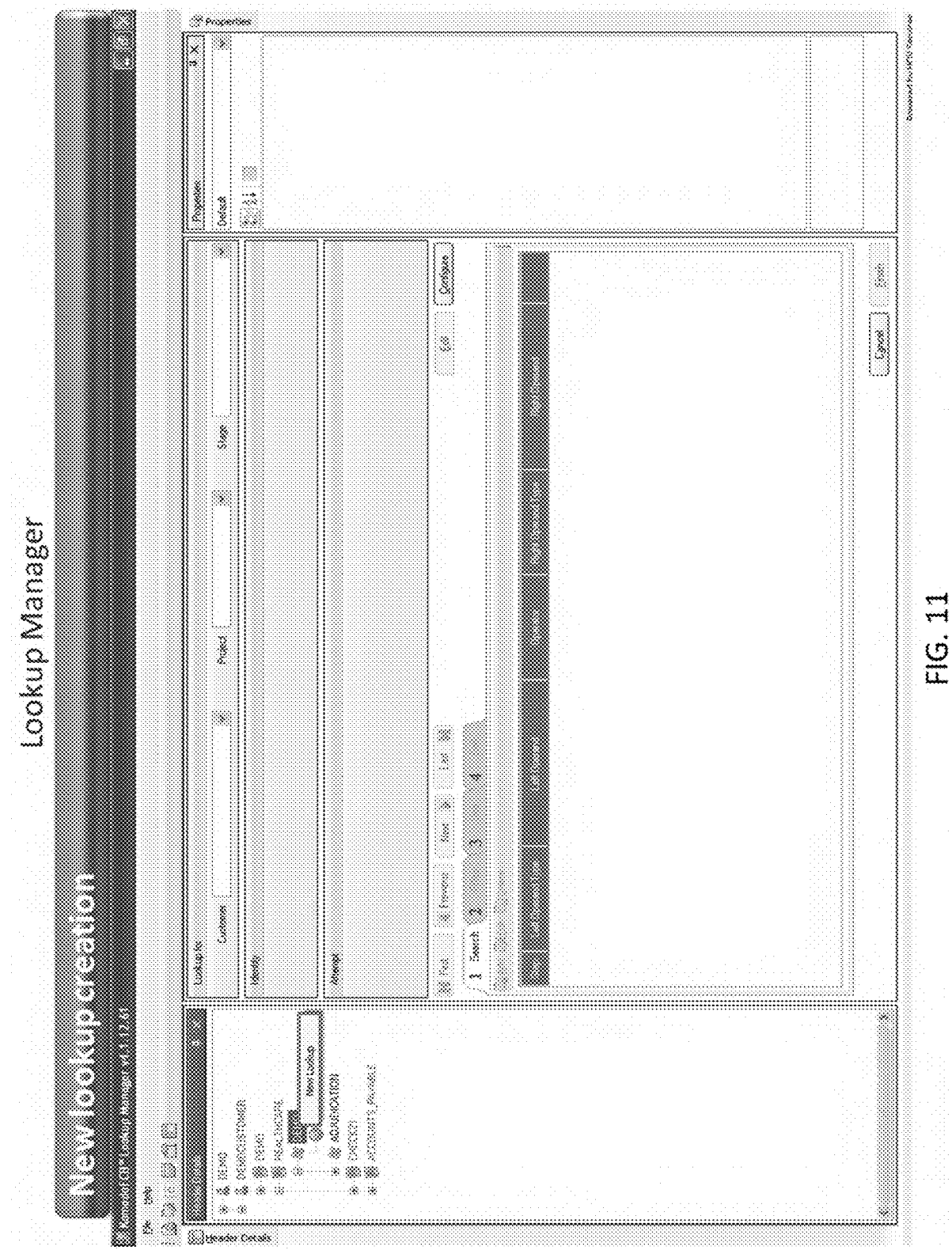
FIG. 11 identifies yet further exemplary features in accordance with some embodiments of the present invention.
Figure 12:
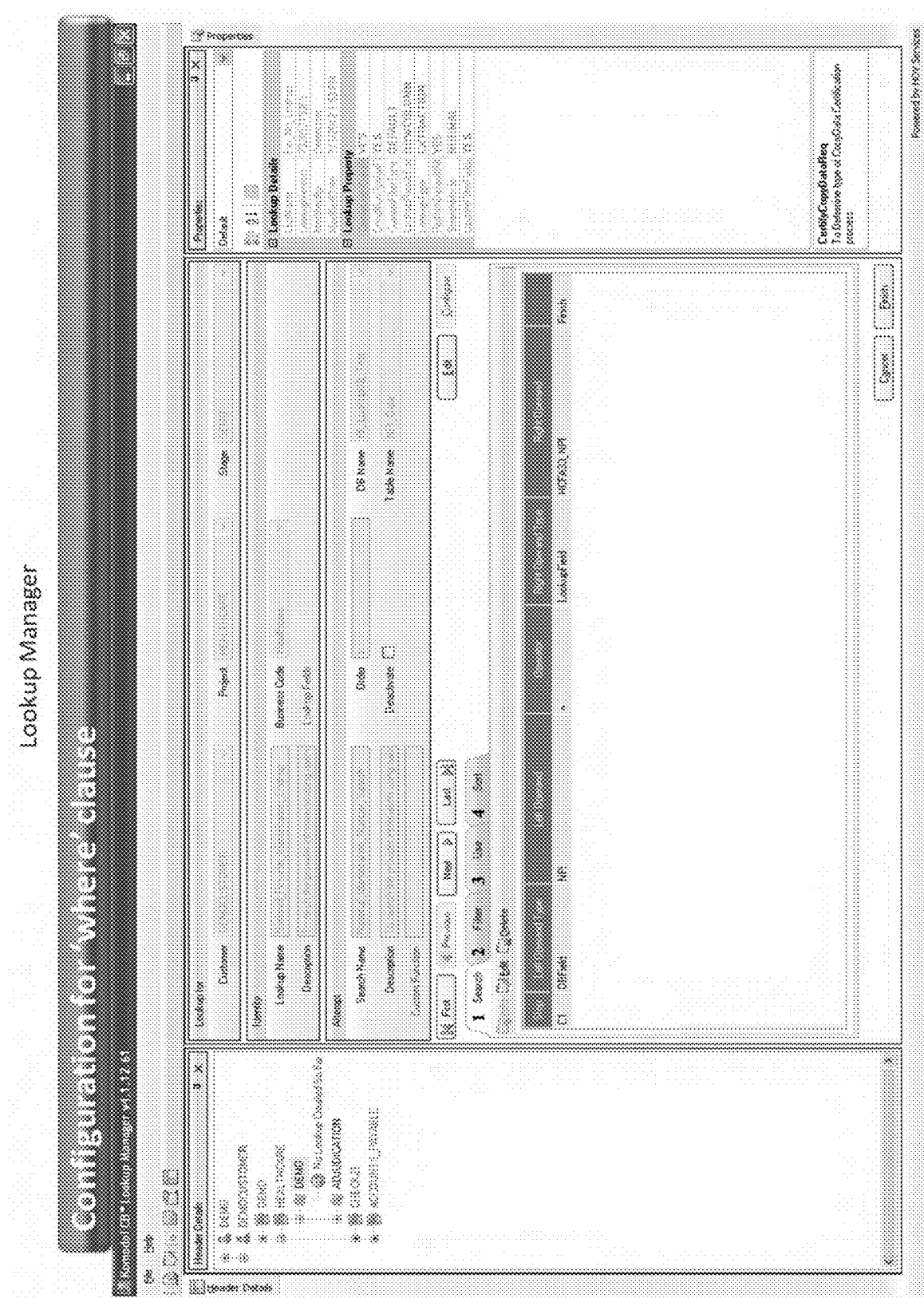
FIG. 12 identifies some exemplary features in accordance with some embodiments of the present invention.
Figure 13:
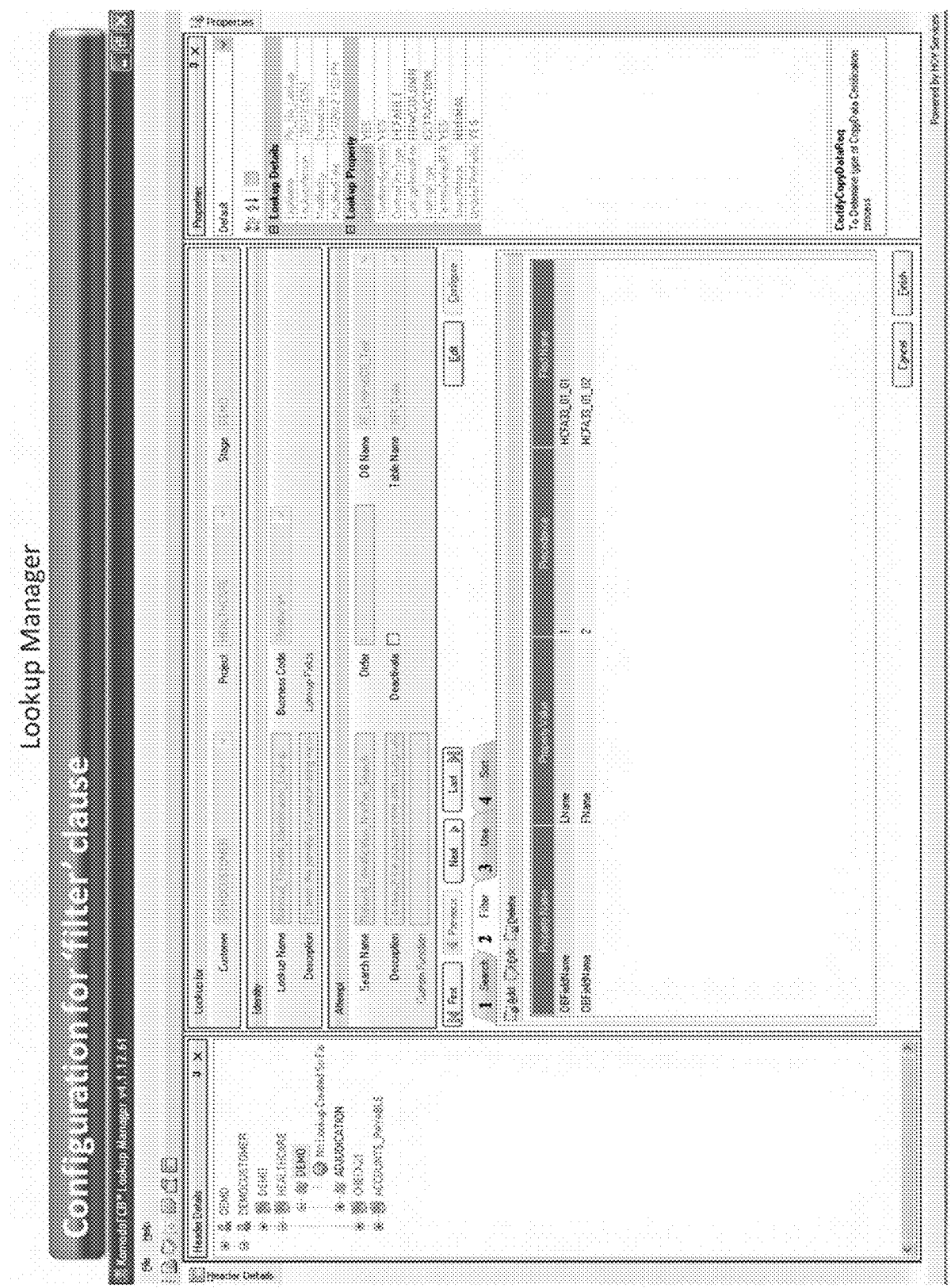
FIG. 13 identifies some exemplary features in accordance with some embodiments of the present invention.
Figure 14:
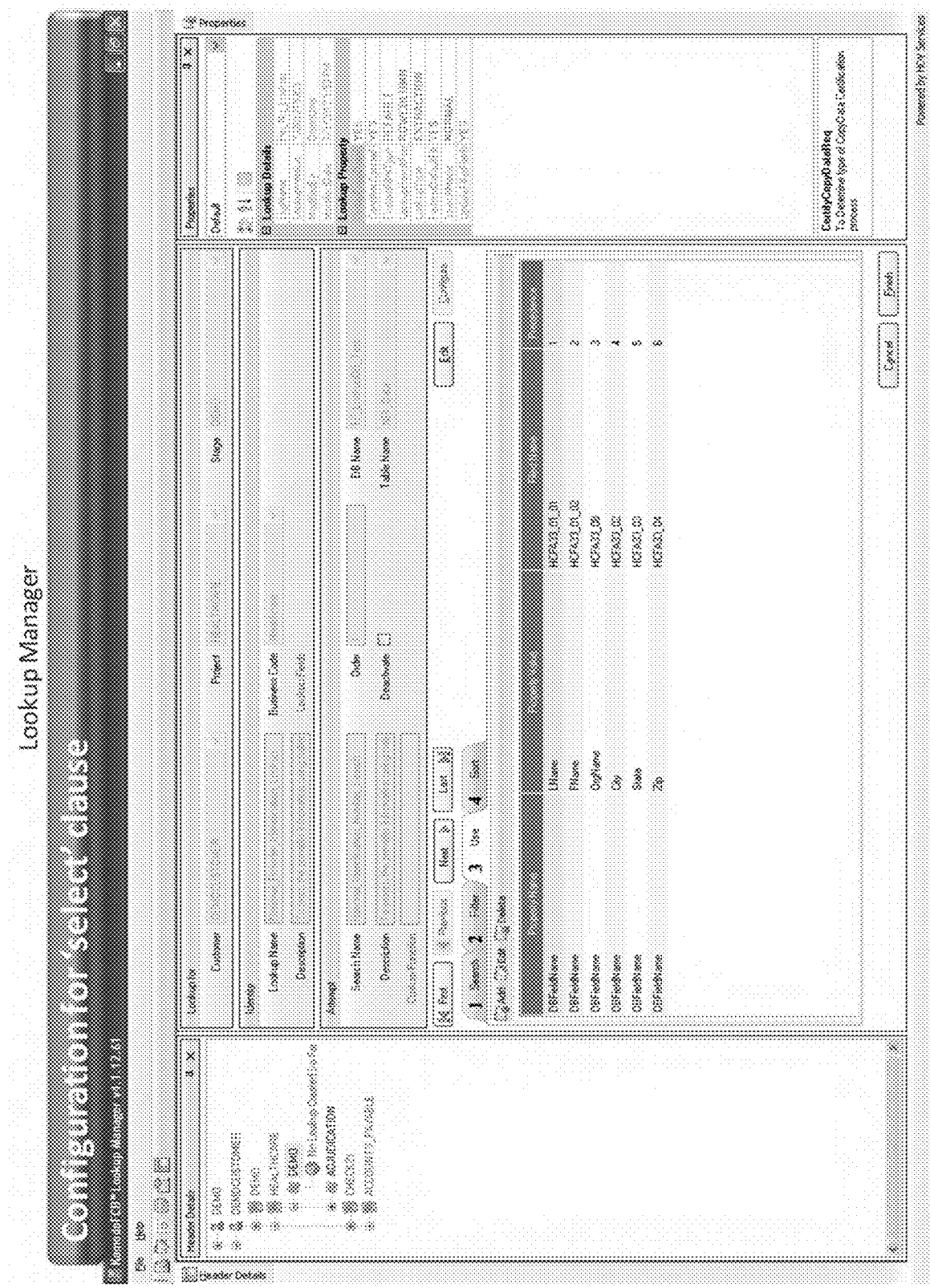
FIG. 14 identifies some exemplary features in accordance with some embodiments of the present invention.
Figure 15:
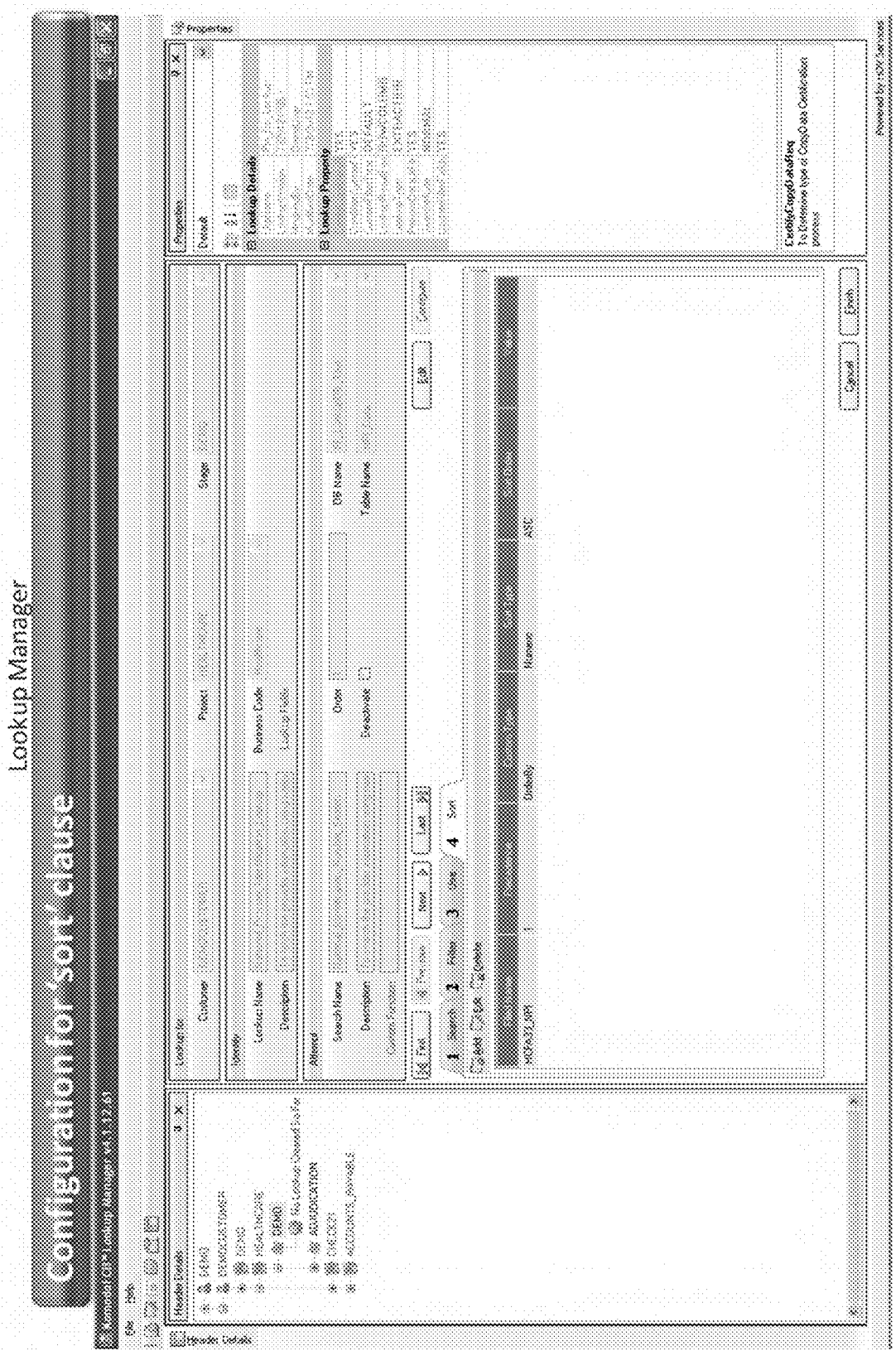
FIG. 15 identifies some additional exemplary features in accordance with some embodiments of the present invention.
Figure 16:
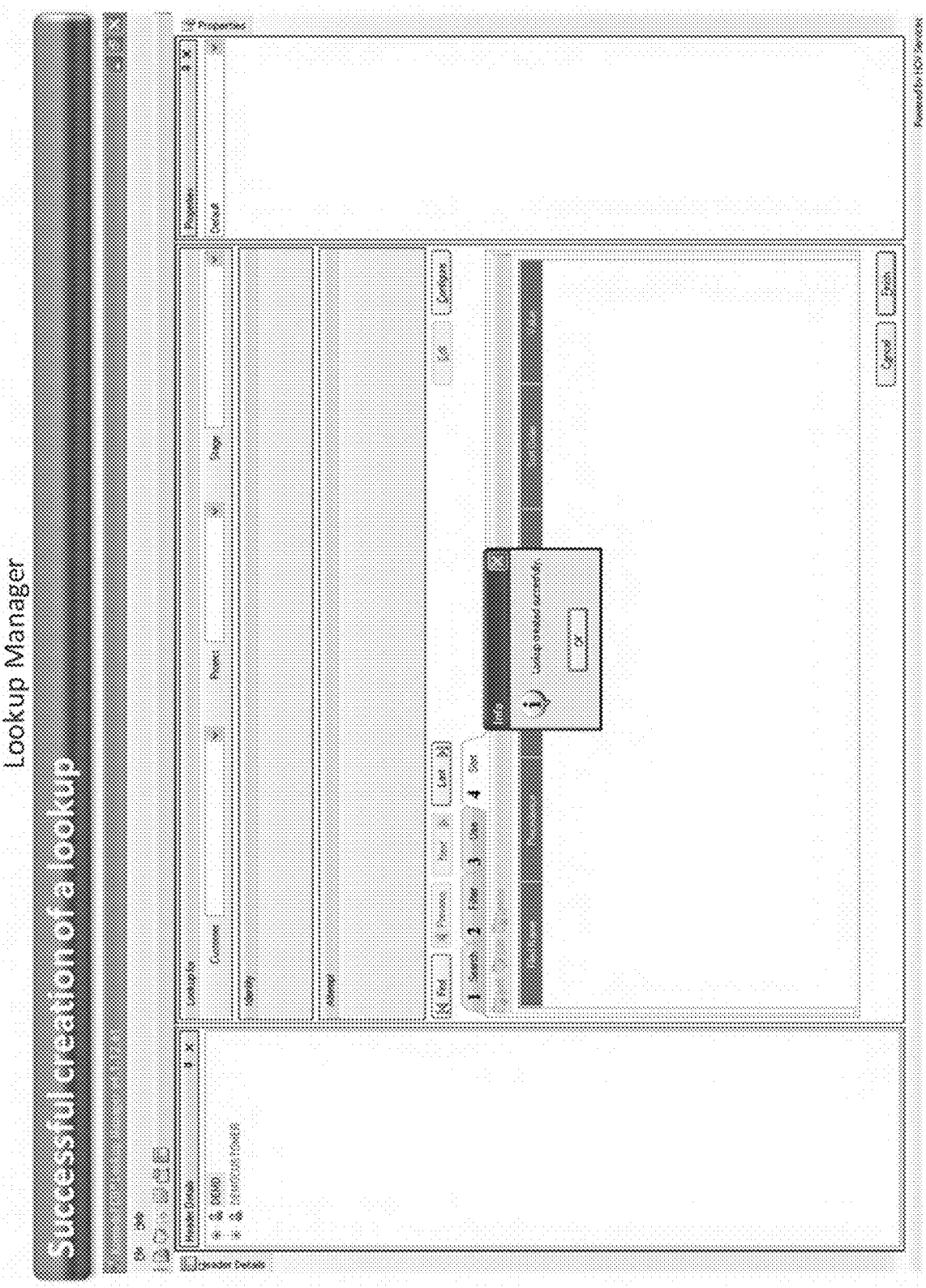
FIG. 16 identifies some exemplary features in accordance with some embodiments of the present invention.

In some embodiments, the instant invention offers an ability of performing extensive lookup by configuring and customizing lookup and overcoming SQL constraints, as, inter alia, shown in FIG. 6.

Figure 4:
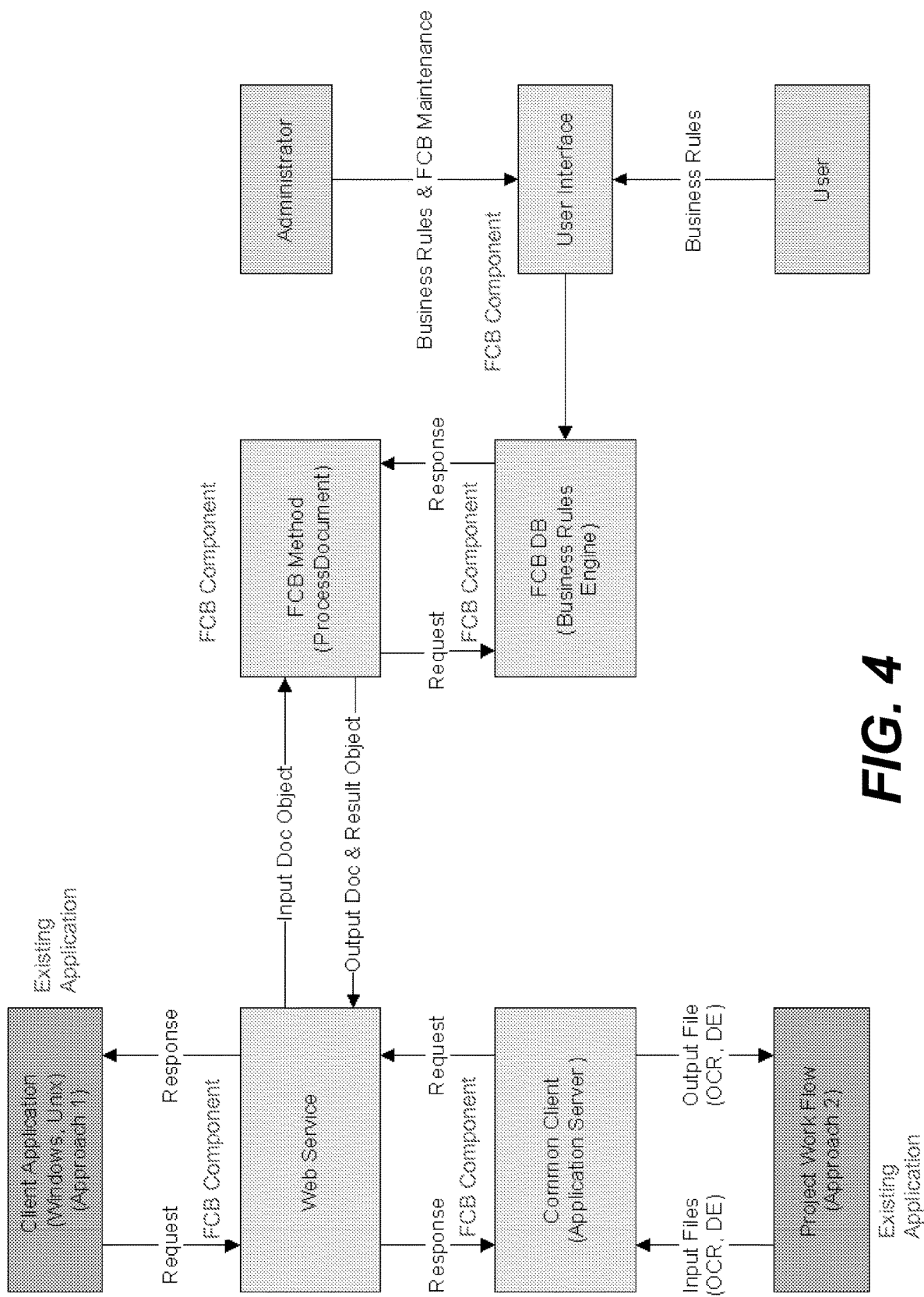
FIG. 4 identifies further exemplary features in accordance with some embodiments of the present invention.

In some embodiments, the instant invention offers a rule transfer facility, allowing rules to be exported and imported from one database repository (e.g., application) to other(s). FIG. 4 identifies some exemplary features provided in accordance with some embodiments of the present invention.

In some embodiments, the instant invention offers a rule version comparison facility, allowing an ability to control business rules execution, switch over to history of rules and/or compare two different version of same business rule.

In some embodiments, the instant invention offers an ability to build rules dynamically and/or ad hoc basis, allowing an ability to configure single rule to serve group of fields that are similar family in particular line of business which can result into minimization of effort involved in configuration and maintenance of those group of fields.

In some embodiments, the instant invention offers an ability of rule testing, by allowing to reuse of test data automatically to save effort and time during Regression Testing.

In some embodiments, the instant invention offers users an editor software tool with controls to create, edit, and manipulate business rules. In some embodiments, the editor software tool can assist in creating, editing and manipulating lookups as part of business rules. In some embodiments, the editor software tool can execute test plan and verify results. In some embodiments, the editor software tool can accommodate arithmetic expression(s) as part of business rules configuration. In some embodiments, the editor software tool can create and inject regular expression as part of business rules configuration. In some embodiments, the editor software tool can provide a user friendly interface for making rearrangement of conditions and/or actions as Decision Table.

In some embodiments, the instant invention supports single rule configuration to act as multiple rules for similar fields using field alias. In some embodiments, the instant invention supports single rule configuration to act as multiple rules for duplicate fields using repeat field function. In some embodiments, the instant invention supports an easy-to-understand format of business rules created. In some embodiments, the instant invention provides authentication and authorization to manage business rules and details. In some embodiments, the instant invention provides multiple level of review and approval while promoting rules to production mode.

In some embodiments, the instant invention provides an intermediate client application as substitute for customers to retrieve and apply business rules without calling business rules engine directly at the clients' end.

In some embodiments, the instant invention provides business rules execution for multiple set of data addresses (e.g., databases resided in one or more places). In some embodiments, the instant invention provides a functionality to parse and split of MICR code.

In some embodiments, the instant invention provides an ability to trace and provide analytical report of Rule Execution.

In some embodiments, the instant invention provides an ability to improve performance of business rules execution by means of enabling caching of software instructions/data as and when required.

In some embodiments, the instant invention provides an ability to build business rules interacting Message Queues. In some embodiments, the instant invention provides an ability to exchange intermediate/real-time decisions among business rules subroutines without demanding data address from a client application.

Figure 5:
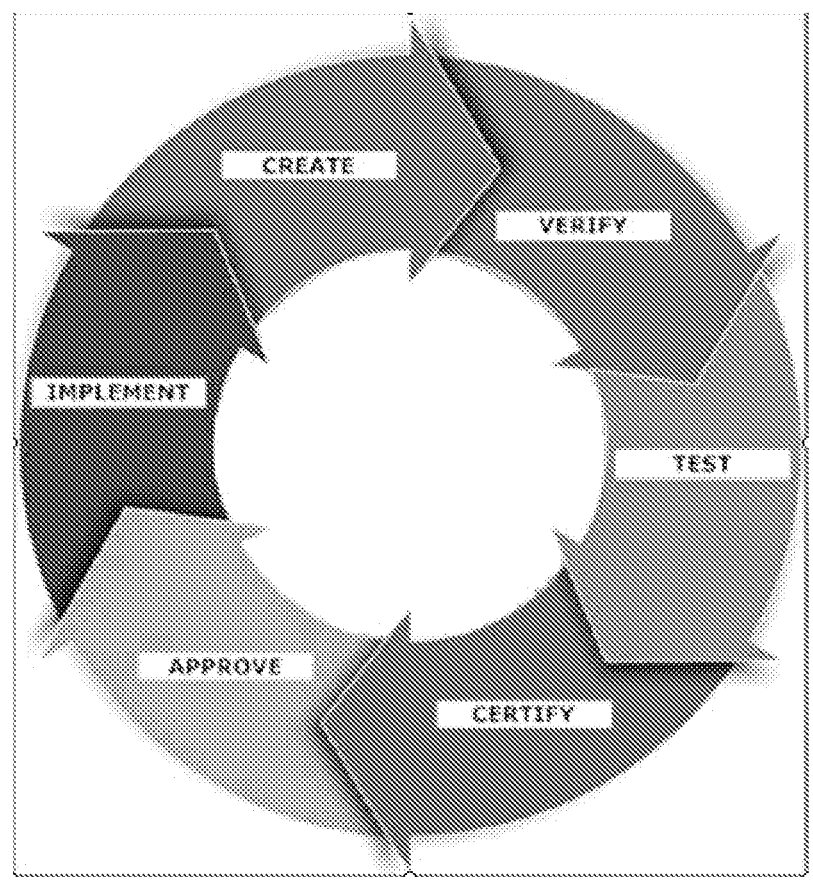
FIG. 5 identifies additional exemplary features in accordance with some embodiments of the present invention.

In some embodiments, the instant invention provides an ability to dynamically control a business rule lifecycle that is, for example, as shown in FIG. 5. In some embodiments, the instant invention provides an ability to dynamically control the business rule lifecycle by, for example, establishing hierarchy of responsibility for rule development, validation, and/or execution:

i) rule creation can be done by business analyst and followed by peer level (senior business analyst) review/verification;

ii) verified rules can be tested by tester and then certified by quality analyst; and iii) certified rules can be approved by release management and deployed to production by administrator In some embodiments, the instant invention provides for, dynamic and real-time, bench-mark evaluation of business rules. In some embodiments, the instant invention provides for expedient activation and deactivation of business rules. In some embodiments, the instant invention provides an ability for mapping of business rules to a plurality projects, stages and/or inputs.

In some embodiments, the instant invention provides for running business rule under SSL and user authentication. In some embodiments, the instant invention provides for a message queue (MQ) handshaking, by, for example, facilitating Message Queue Publish and Subscribe concept to interact with Customer Systems with Service account authentication.

FIG. 6 identifies some exemplary features provided in accordance with some embodiments of the present invention. In some embodiments, the rule engine(s) is/are programmed to perform, in real-time, numerous concurrent transactions and factors, and adjust business rules based on ad hoc/real-time/dynamic changes that can be occurred/developed as rules are being executed.

Example #3: Dynamic Rule Generation Algorithm & Validation Engine Weighting Factors A) Exemplary Algorithm for Dynamic Rule Generation In some embodiments, the instant invention provides for an ability to configure single rule to serve a group of fields that are similar for a particular line of business, minimizing efforts involved in configuration and maintenance of those group of fields.

Step 1: Validate the Customer. If valid go to Step 2, otherwise go to Step 10

Step 2: Validate the Request Data. If valid go to Step 3, otherwise go to Step 10

Step 3: Load the Condition(s) of all the rules

Step 4: Load the Action(s) of all the rules

Step 5: Check whether dynamic rule generation (alias) is mentioned in the Condition OR/AND Action. If yes go to Step 6, otherwise Step 9

Step 6: If Rule generation (alias) is mentioned in Condition(s) and Action(s) then go to Step 7, otherwise go to Step 8

Step 7: Check whether count of generation in Condition is matching with Action. If count matches then go to Step 9 otherwise go to Step 11

Step 8: Generate rules based on the alias count configured; load the Conditions/Actions accordingly Step 9: Expand and Execute the Conditions. If Condition is true then trigger True Actions otherwise trigger False Actions. Go to Step 12

Step 10: Update system error in the Response Data and go to Step 12

Step 11: Update data error in the Response Data

Step 12: Footprints are logged and the rule execution results are sent back as Response B) Validation Rule Engine-Weighting Factors In some embodiments, the instant invention provides a validation rule engine that validates each designed rule based, at least in part, on rule features. In some embodiments, the rule features are rule capabilities such as, but not limited to, at least one performance task associated with a particular rule. In some embodiments, the rule features are rule characteristics such as, but not limited to, easiness of understanding a rule's expression. In some embodiments, the rule features are a combination of the rule capabilities and the rule characteristics. In some embodiments, as shown in Table 1, the validation engine validates the rule for presence or absence of the rule features based, at least in part, on weighting factors of how important a particular rule feature is to the rule and/or to the business logic within which the rule would be employed.

TABLE 1

| S. No. | Features | Weighting Factors |
|---|---|---|
| 1 | Easy-to-Understand Rule Phrase | 4 |
| 2 | Extensive Lookup | 3 |
| 3 | Rule Transfer Facility | 4 |
| 4 | Rule Version Comparison Facility | 4 |
| 5 | Dynamic Rules | 3 |
| 6 | Multi-level Rule Validation/Certification | 4 |
| 7 | Testing Manager (includes Regression Testing) | 3 |
| 8 | Rule Manager and Rule Execution | 4 |
| 9 | Decision Table | 2 |
| 10 | MQ Handshaking | 2 |

Weighting Factors:
0—Not Important
1—Less Significant
2—Significant
3—Highly Significant
4—Absolute or mandatory requirement In some embodiments, the instant invention can dynamically interface with computer systems of users to receive and provide data.

In some embodiments, the inventive methods and computer systems of the instant invention can be applied to dynamically create, monitor/audit and/or adjust rules for at least one of the following applications, but are not limited to:
i) Accounts Payable:
Approval of Non-POs and POs with exceptions
Creating work requests for Check Requests, Credit Memos etc.
Exception clearance
Disputes Management (in conjunction with PCF)
ii) Operations:
Data entry
Data clean-up
Visual audit
iii) Human Resources:
Leave management workflows
Timecard management
Expenses reimbursement and approval
iv) Administration:
Physical Assets Management
Purchase: Indents workflow
v) Enrollment workflows:
v.1) Education:
School pupils' records management
Lending Library—Books management
v.2) Tracking systems:
Inventory Tracking
Issue lifecycle management (issue tracker)
Change Request Management.

In some embodiments, the instant invention utilizes a business rules creation and management engine(s) (Rule Editor) to allow users to create and test rules to be employed in various computer applications. In some embodiments, of the instant invention allows users to interactively design rules and test/validate (e.g., regression testing) them. In some embodiments, the user can test/validate rules either individually or in a group. In some embodiments, users can test/validate an entire rule or only certain condition(s) of that rule.

FIGS. 7-10 illustrate exemplary user interfaces of the Rule Manager of the instant invention.

FIGS. 11-18 illustrate exemplary user interfaces for creating customizable lookups (e.g., SQL lookups). In some embodiments, input values given in 'where' clause can be refined based on predetermined conditions/requirements.

Figure 19:
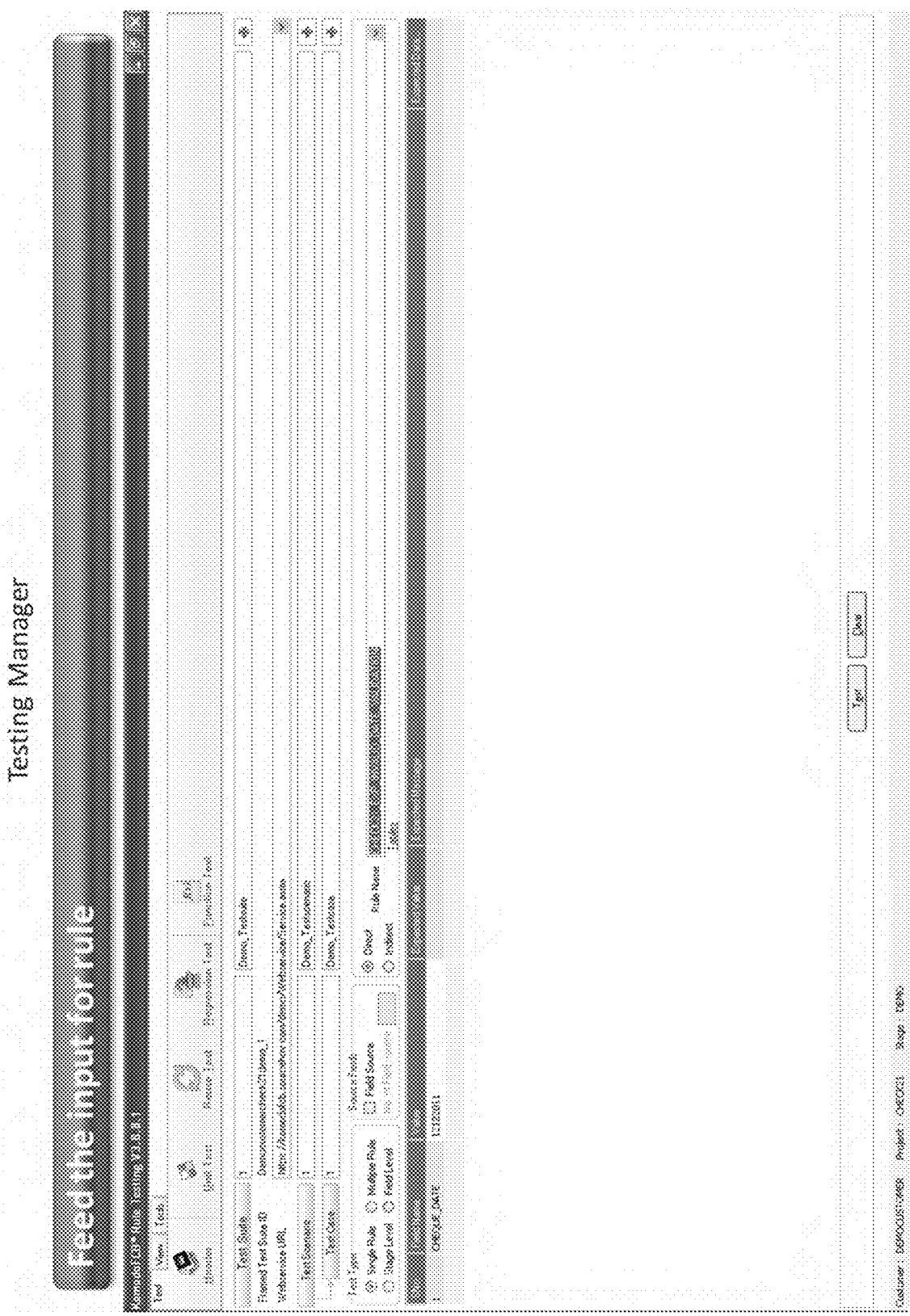
FIG. 19 identifies some exemplary features in accordance with some embodiments of the present invention.
Figure 20:
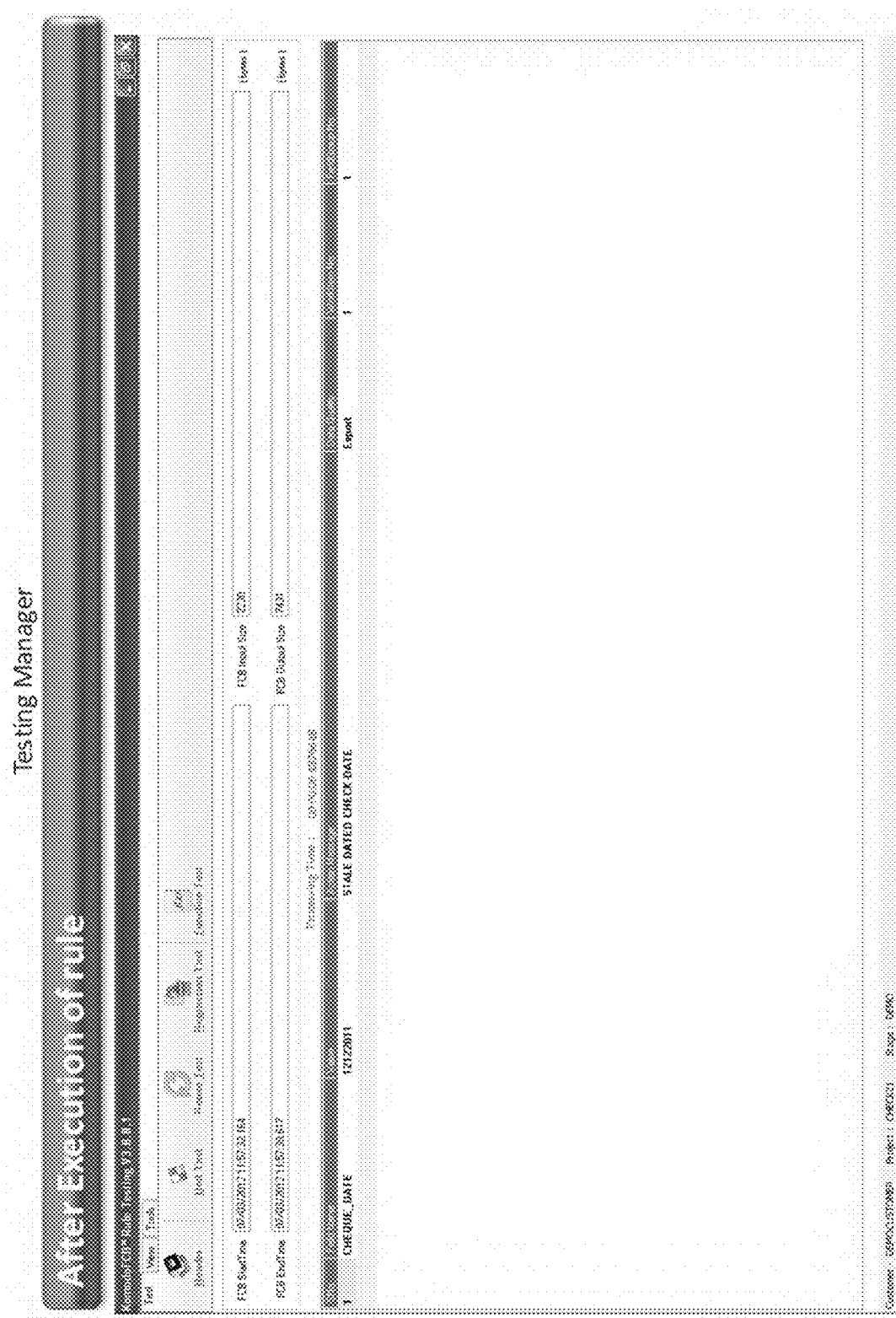
FIG. 20 identifies some exemplary features in accordance with some embodiments of the present invention.
Figure 21:
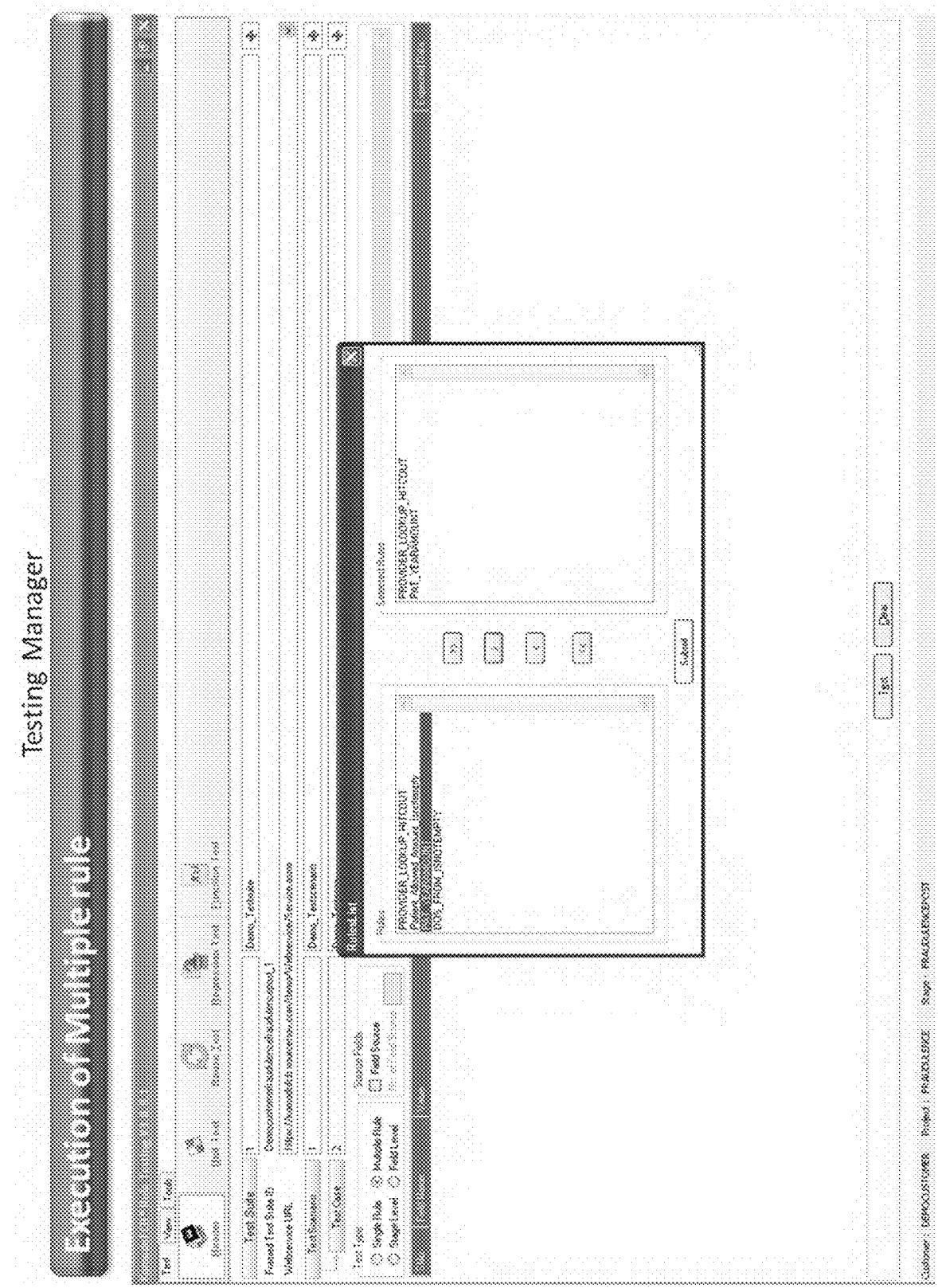
FIG. 21 identifies some exemplary features in accordance with some embodiments of the present invention.

FIGS. 19-21 illustrate exemplary screens utilized to test a particular rule (e.g., the designed rule).

Figure 22:
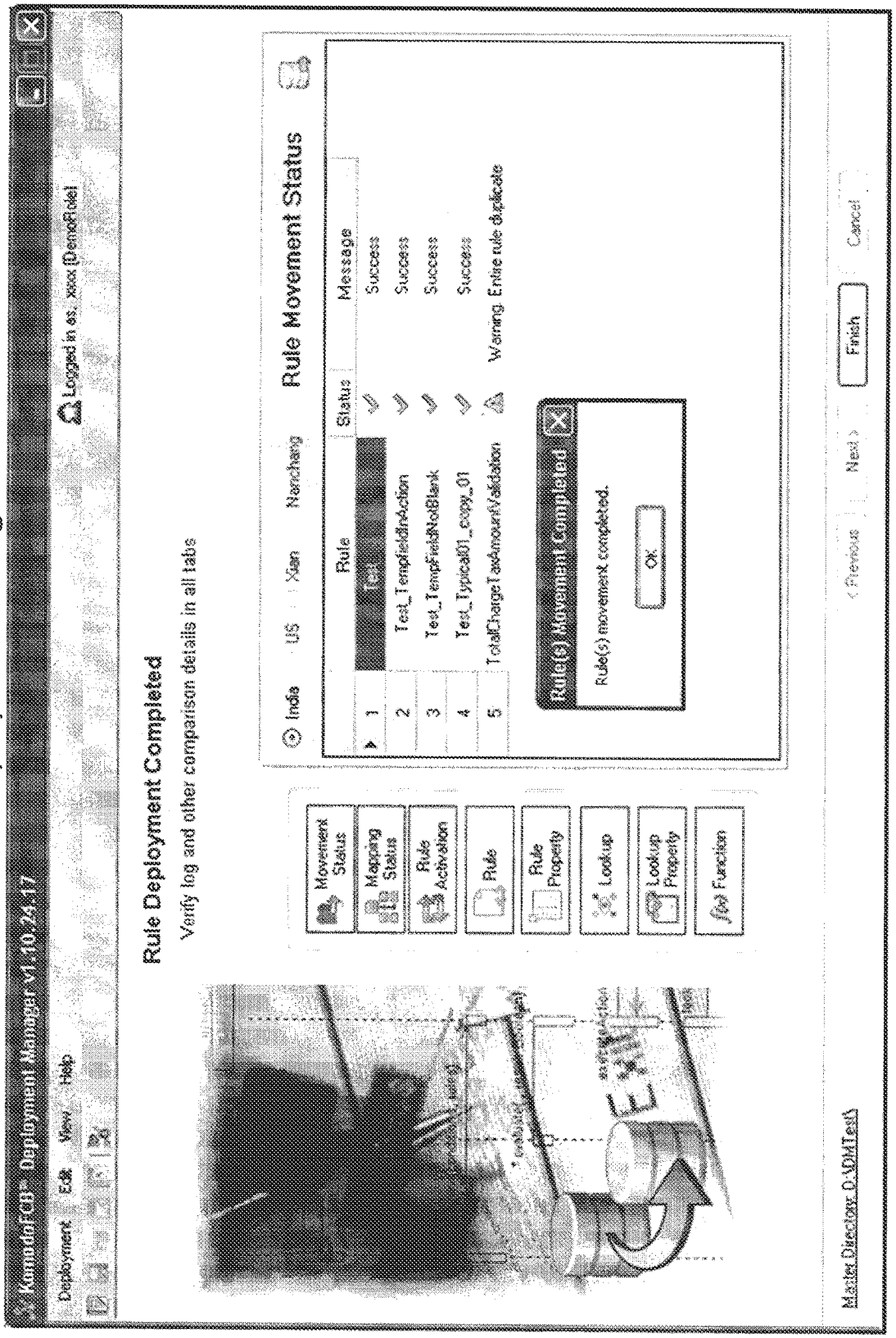
FIG. 22 identifies some exemplary features in accordance with some embodiments of the present invention.

FIG. 22 illustrates an exemplary screen utilized to deploy a particular rule into a computer program (e.g., the designed rule).

In some embodiments, a file wise testing of a rule is performed.

Figure 23:
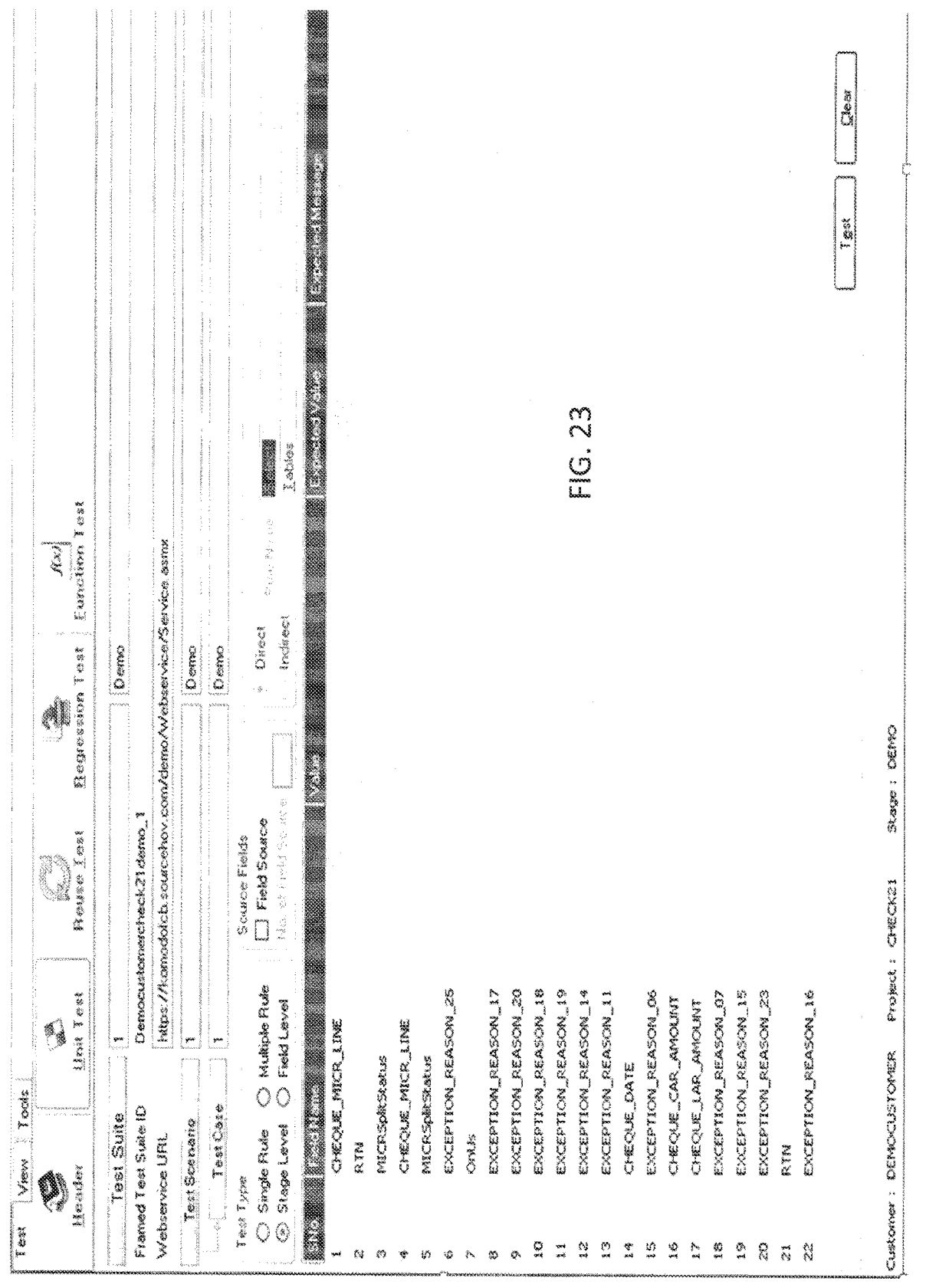
Figure 24:
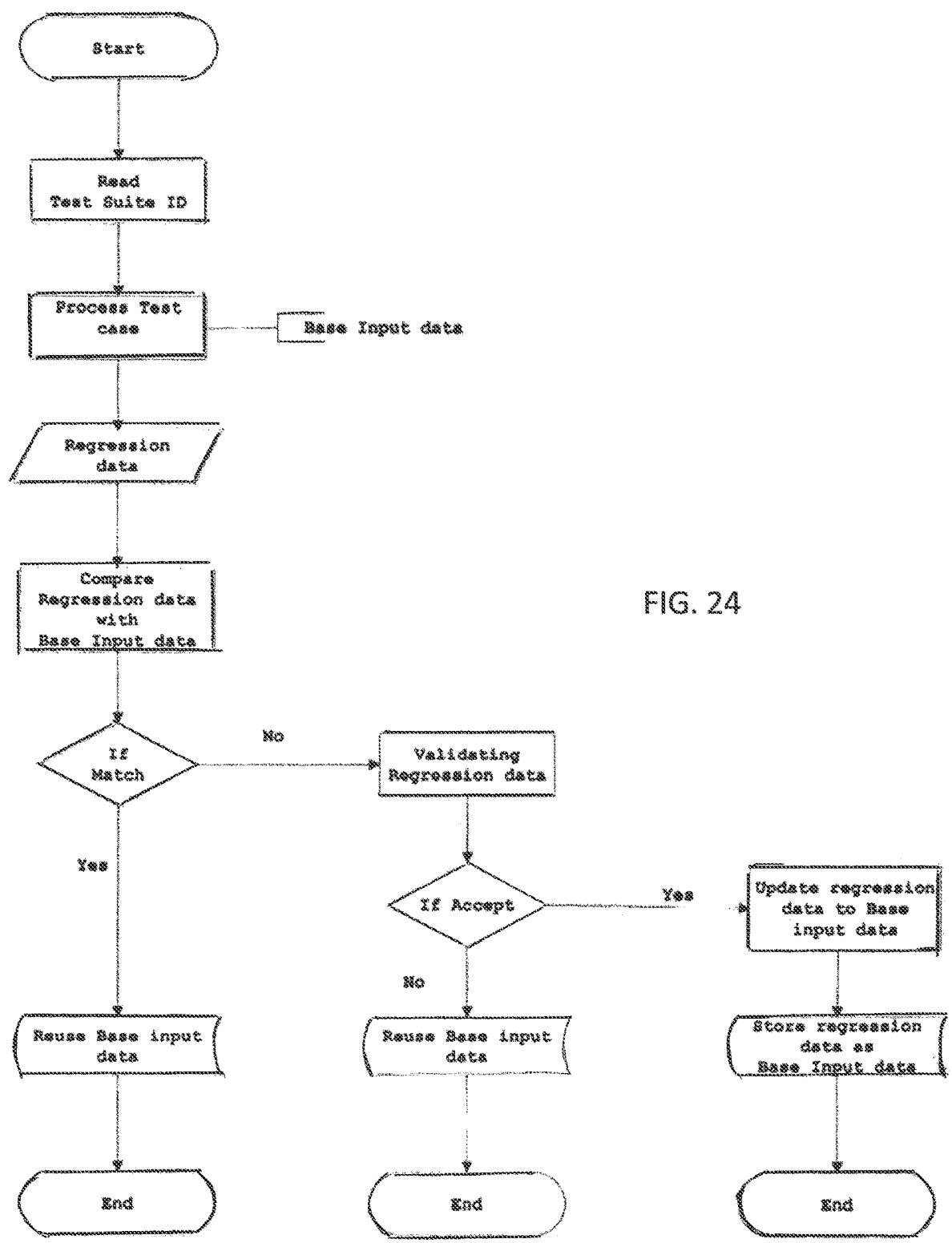
FIG. 24 identifies an exemplary flowchart in accordance with some embodiments of the present invention.

In some embodiments, a regression testing of a rule is performed (FIGS. 23 and 24 (exemplary flowchart of regression testing)).

Figure 25:
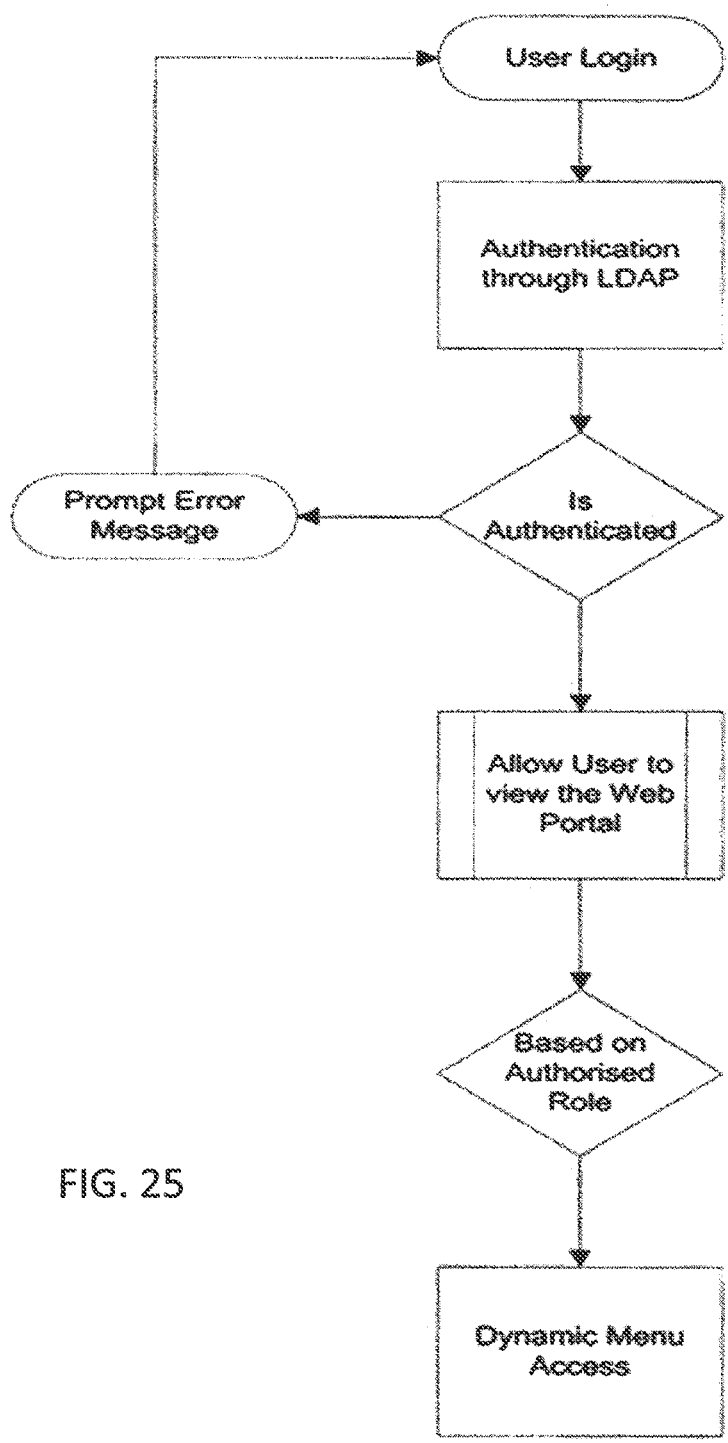
FIG. 25 identifies an exemplary flowchart in accordance with some embodiments of the present invention.

In some embodiments, users can be authenticated using LDAP control, similarly to the operation of the workflow engine; the instant system utilizes user profiles to allow authorization to view/manage processes within the rule engine. In some embodiments, different profiles can be created based on roles. FIG. 25 illustrates an exemplary flowchart for user authentication an authorization.

Figure 26:
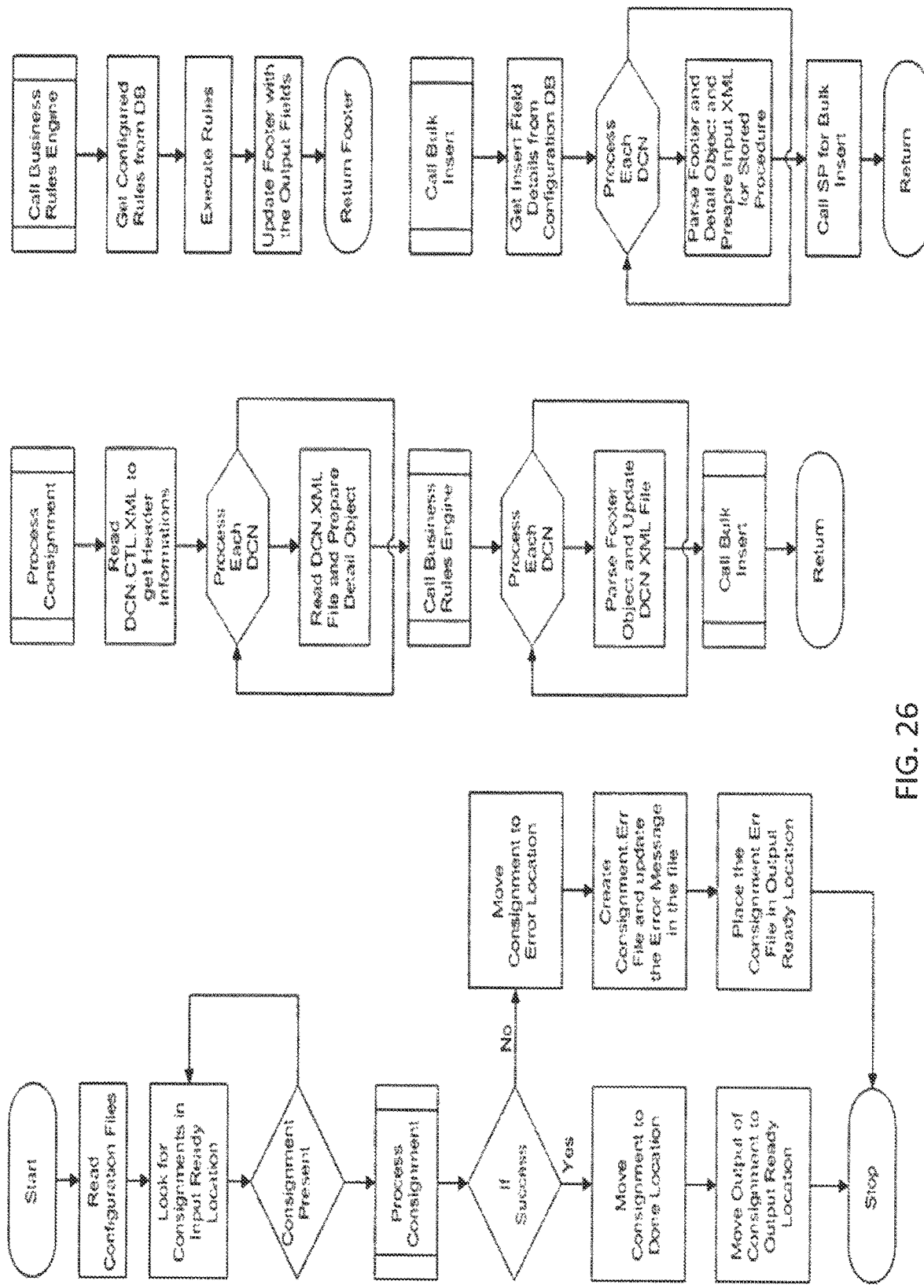
FIG. 26 identifies yet another exemplary flowchart in accordance with some embodiments of the present invention.

FIG. 26 illustrates an exemplary intermediate client application as substitute for users to retrieve and apply business rules without calling business rule engine directly at their end.

Figure 27:
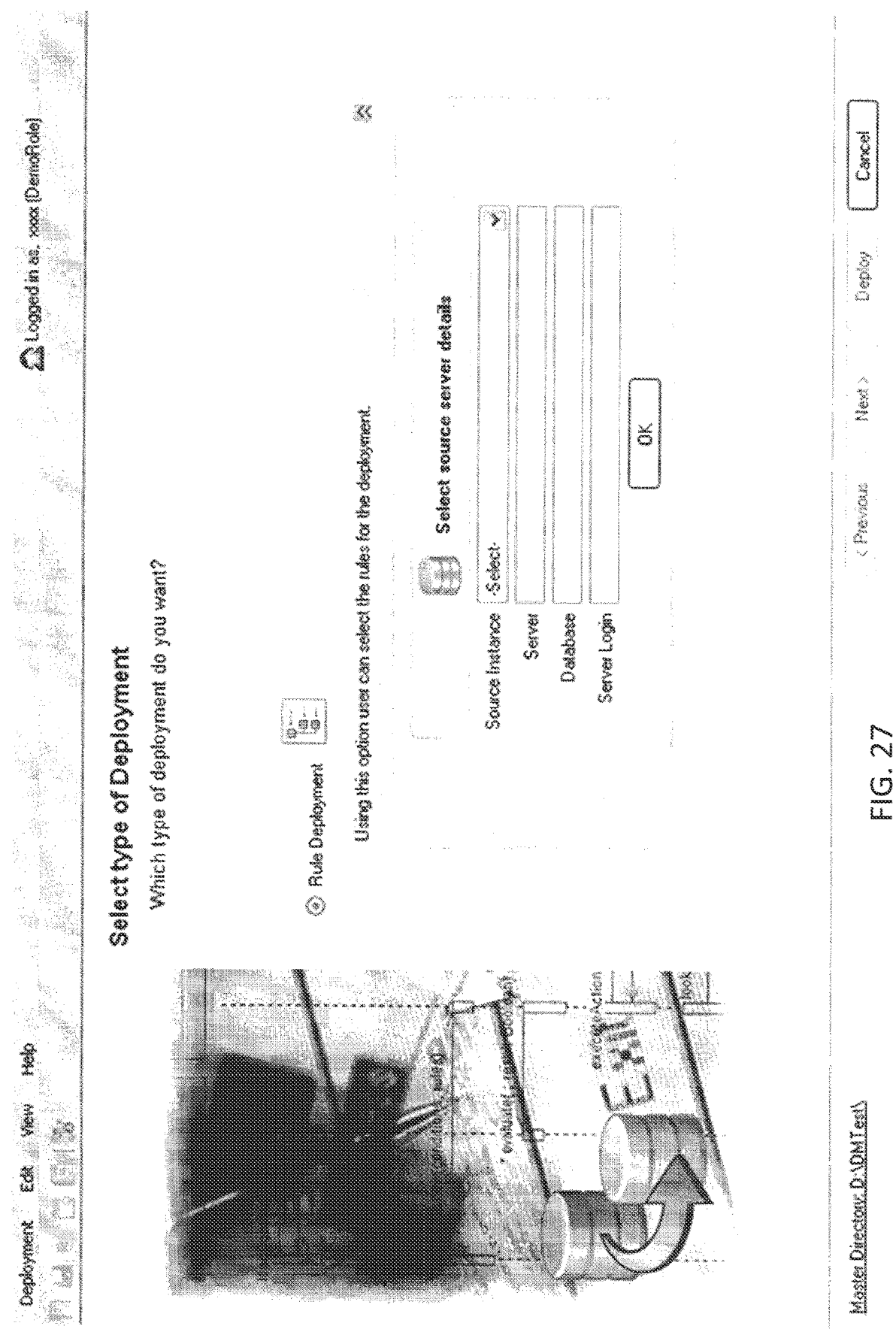
FIG. 27 identifies some exemplary features in accordance with some embodiments of the present invention.
Figure 28:
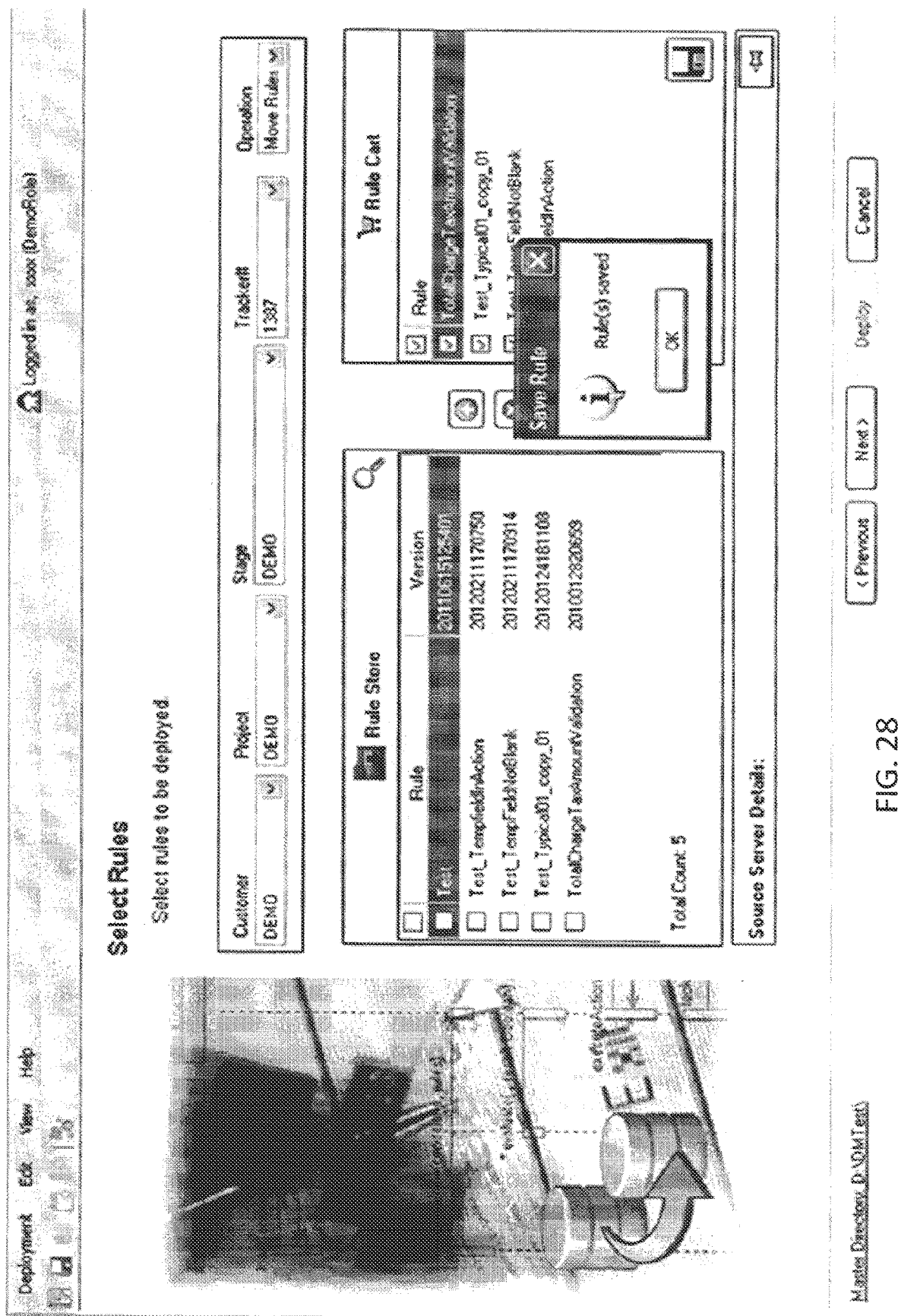
FIG. 28 identifies some exemplary features in accordance with some embodiments of the present invention.
Figure 29:
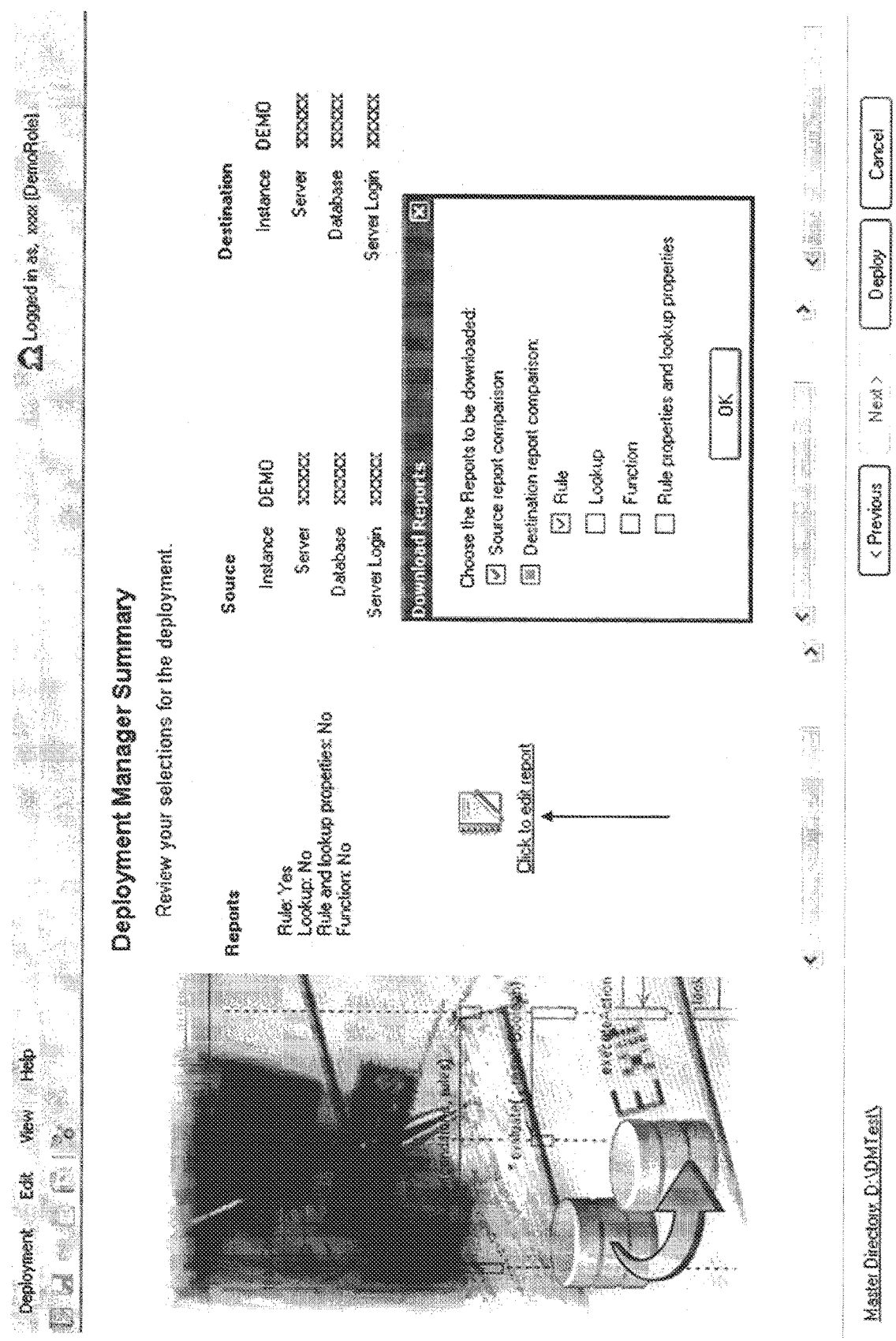
FIG. 29 identifies some exemplary features in accordance with some embodiments of the present invention.
Figure 30:
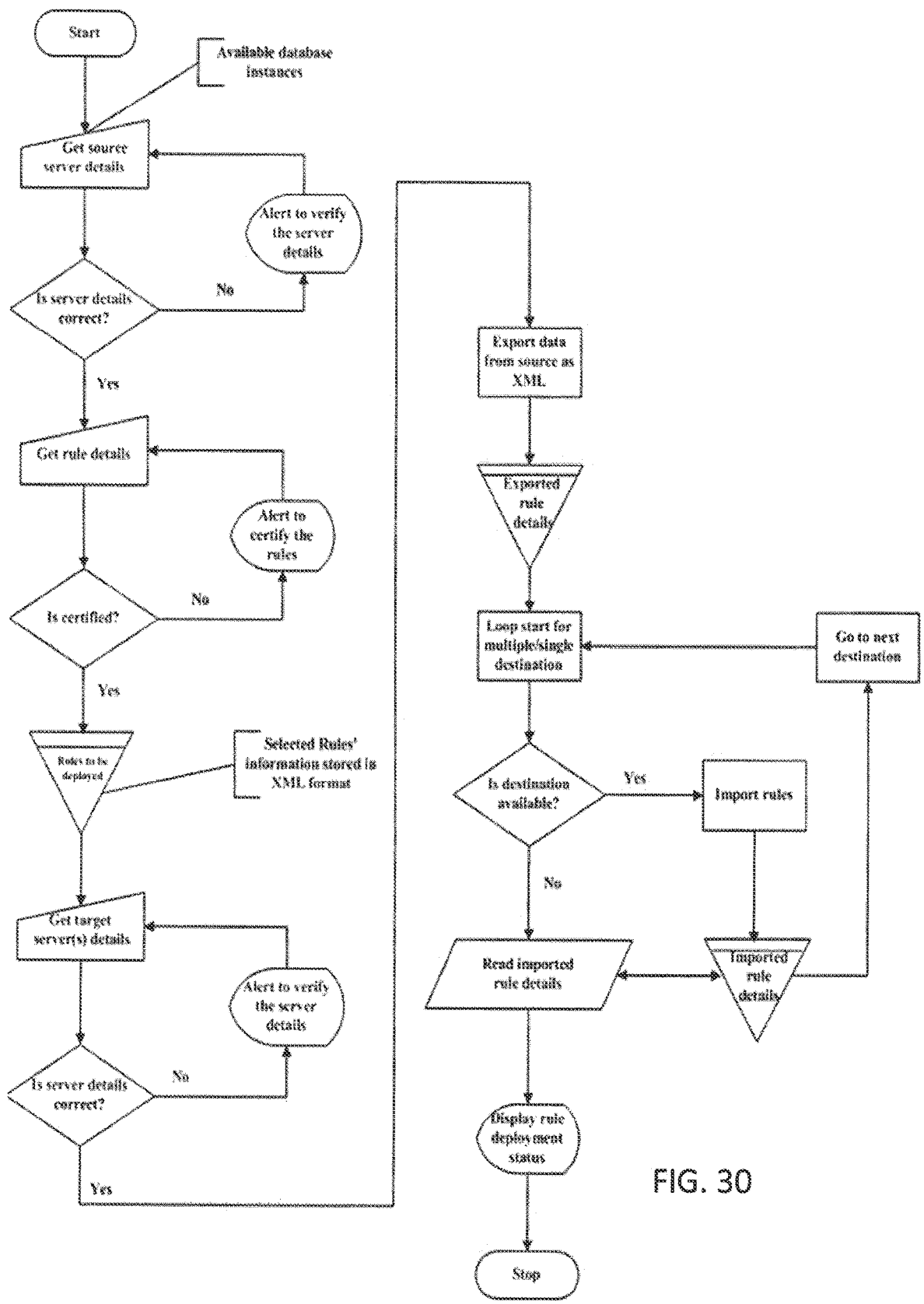
FIG. 30 identifies yet another exemplary flowchart in accordance with some embodiments of the present invention.

FIGS. 27-29 illustrate exemplary screens that allow user to deploy tested rules into business rule logic of, for example, the workflow engine. FIG. 30 illustrates an exemplary flowchart of a deployment manager of the instant invention.

Figure 31:
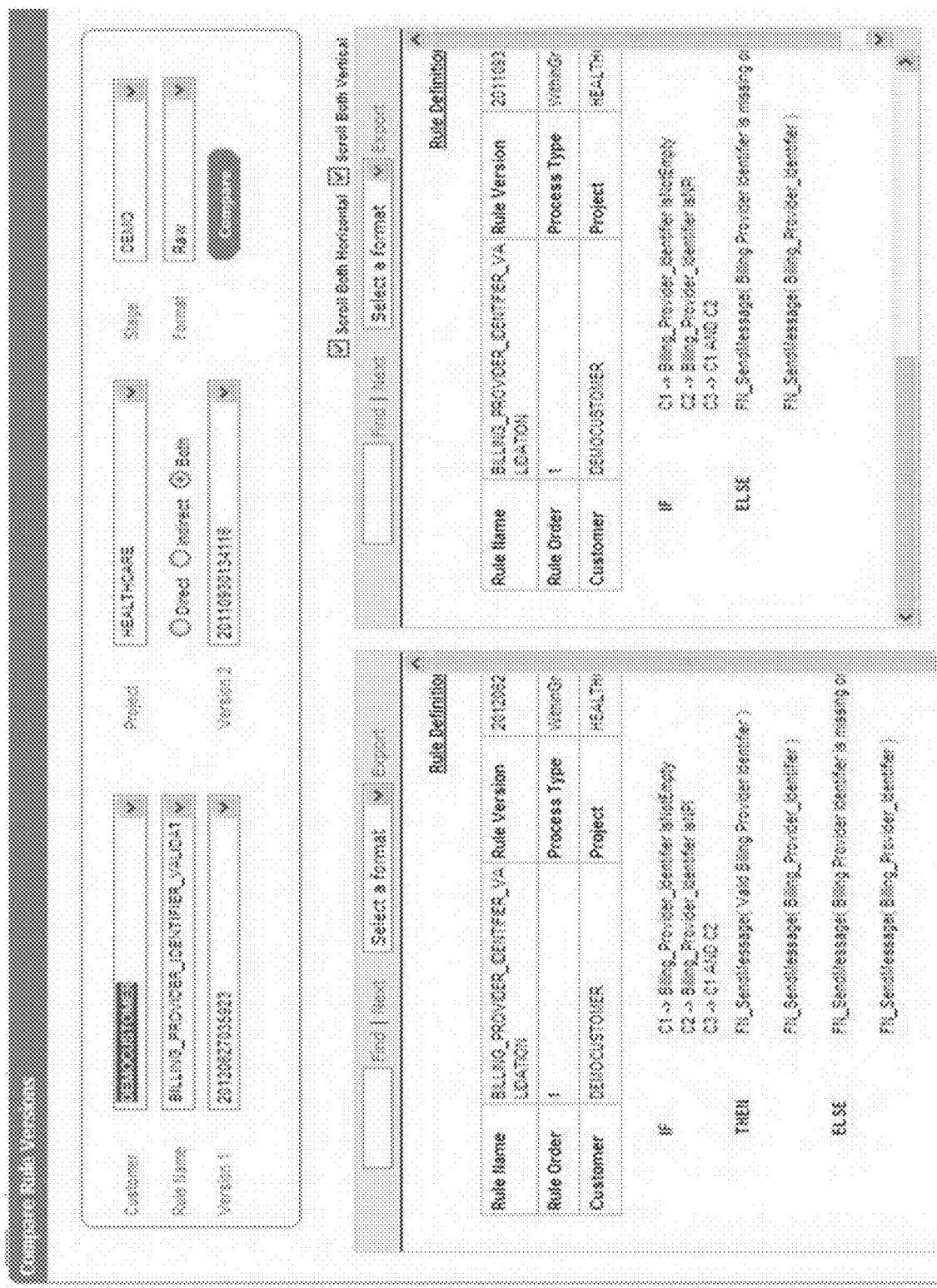
FIG. 31 identifies some exemplary features in accordance with some embodiments of the present invention.
Figure 32:
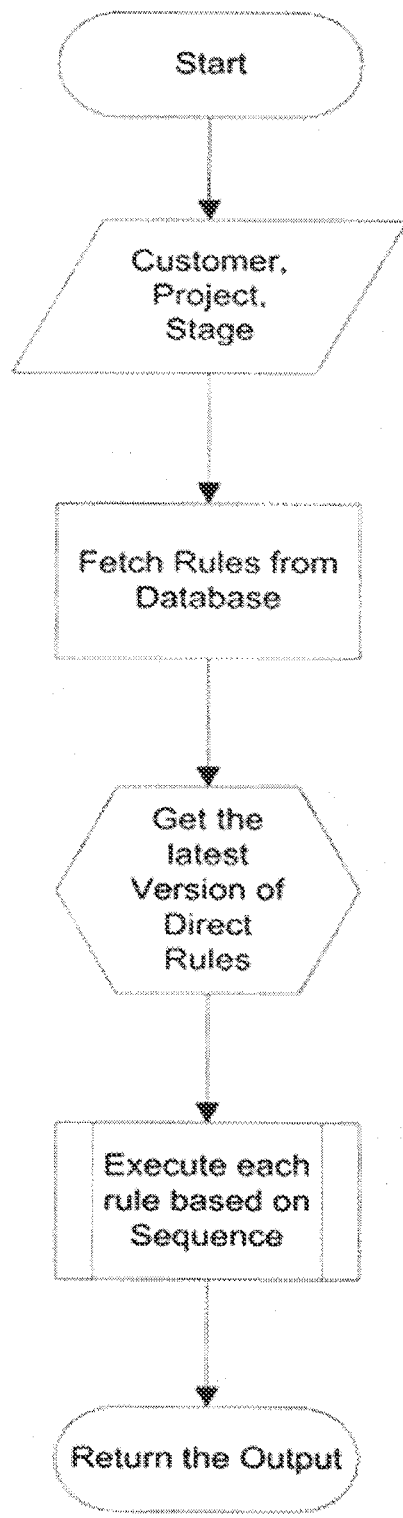
FIG. 32 identifies yet another exemplary flowchart in accordance with some embodiments of the present invention.

FIGS. 31-32 illustrate examples of how the instant invention provides a functionality to control business rules execution within the workflow engine environment, switch over to historical data about executed rules and compare two different versions (i.e., current and past) of same business rule.

Figure 33:
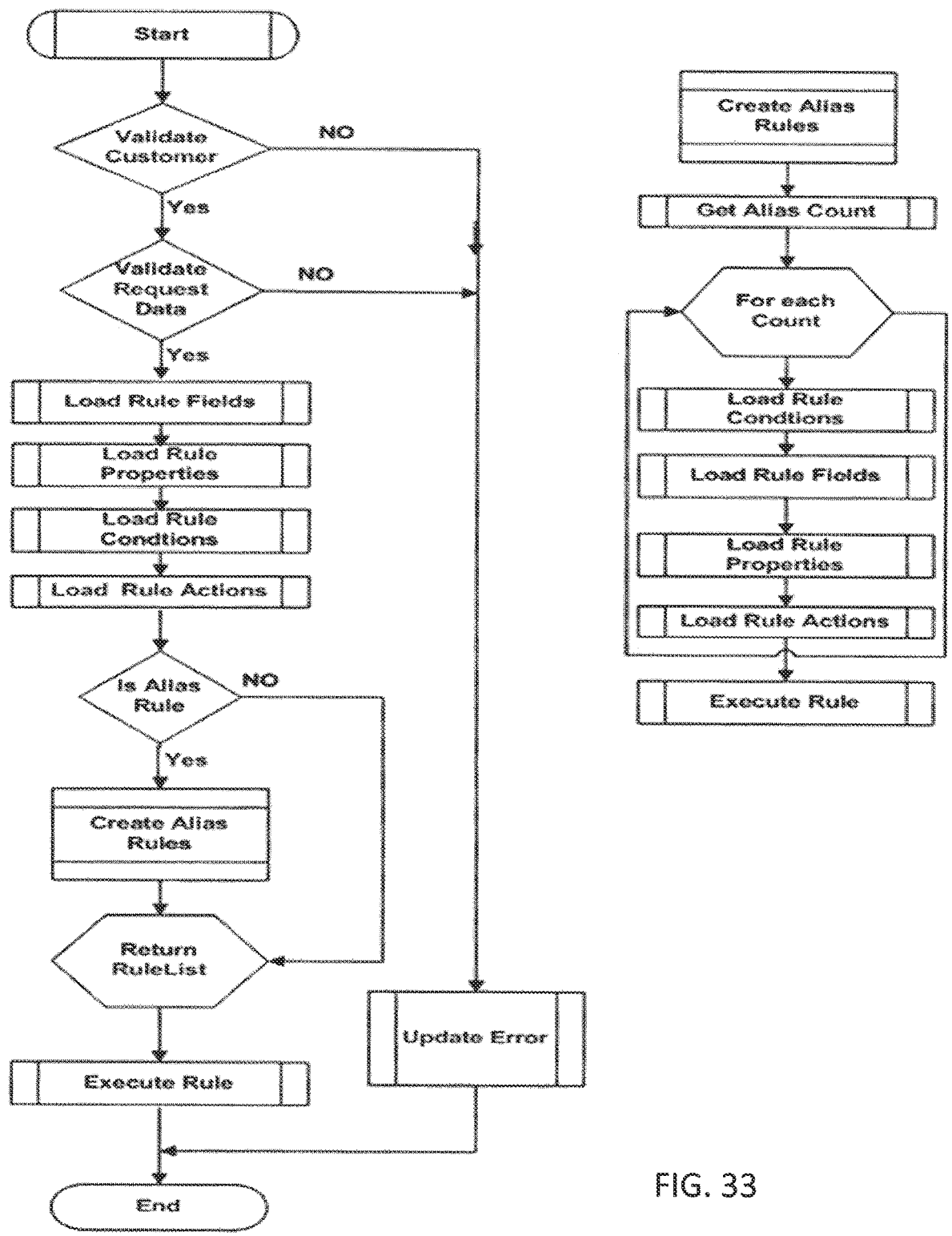
FIG. 33 identifies yet another exemplary flowchart in accordance with some embodiments of the present invention.

FIG. 33 illustrates an exemplary flowchart of how the instant invention provides a functionality to configure a single rule to serve group of fields that are in a similar family for a particular line of business.

In some embodiments, the instant invention includes a computer-implemented method that includes at least: specifically programming at least one computer system to perform at least the following: receiving a first plurality of conditions and a second plurality of actions; determining at least one first rule by at least one first rule engine based, at least in part, on the first plurality of conditions and the second plurality of actions; where the at least one first rule is designed to operate in at least one first computer program and where the at least one first computer program is operationally distinct from the at least one first rule engine; dynamically validating, by the at least one first rule engine, the at least one first rule for a deployment in the at least one first computer program, where the dynamically validating at least includes: evaluating the at least one first rule based, at least in part, on a third plurality of rule features, where each rule feature is associated with a weighting factor identifying a requirement level applicable to each rule feature, and testing a first performance of the at least one first rule based, at least in part, on test data related to the at least one first computer program; and deploying the at least one first rule into the at least one first computer program after the at least one first rule having been validated.

In some embodiments, the testing the performance of the at least one first rule further includes at least: comparing the first performance of the at least one first rule to a second performance of the at least one first rule, where in the second performance represents a historical performance of the at least one first rule.

In some embodiments, the testing the performance of the at least one first rule further includes at least: performing a regression testing of the at least one first rule.

In some embodiments, the testing the performance of the at least one first rule further includes at least: performing a file-wise testing of the at least one first rule.

In some embodiments, the deploying the at least one first rule into the at least one first computer program includes at least: adapting the at least one first rule to serve a group of objects related to at least one first business process.

In some embodiments, the group of objects are in at least one second computer program, where the at least one first and the at least one second computer programs are related to the at least one first business process. In some embodiments, at least one first object of the group of objects is a lookup field.

In some embodiments, the instant invention includes a computer system that at least includes the following components: a non-transient memory having at least one region for storing computer executable program code; and at least one processor for executing the program code stored in the memory, where the program code at least includes: code to receive a first plurality of conditions and a second plurality of actions; code to determine at least one first rule by at least one first rule engine based, at least in part, on the first plurality of conditions and the second plurality of actions; where the at least one first rule is designed to operate in at least one first computer program and where the at least one first computer program is operationally distinct from the at least one first rule engine; code to dynamically validate, by the at least one first rule engine, the at least one first rule for a deployment in the at least one first computer program, where the code to dynamically validate the at least one first rule includes at least: code to evaluate the at least one first rule based, at least in part, on a third plurality of rule features, where each rule feature is associated with a weighting factor identifying a requirement level applicable to each rule feature, and code to test a first performance of the at least one first rule based, at least in part, on test data related to the at least one first computer program; and code to deploy the at least one first rule into the at least one first computer program after the at least one first rule having been validated.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A computer-implemented method, comprising:
    receiving a plurality of conditions;
    receiving a plurality of actions;
    determining, by a rule engine, a rule based, on the plurality of conditions and the plurality of actions, wherein the rule operates in a computer program operationally distinct from the rule engine;
    dynamically validating, by the rule engine, the rule for a deployment in the computer program, wherein the dynamically validating comprises:
        identifying a plurality of rule features of the rule, wherein each rule feature is associated with a weighting factor comprising a value from a range of weight values, the range of weight values comprising a minimum value corresponding to a non-important rule feature and a maximum value corresponding to a required rule feature,
        comparing the plurality of rule features to a set of rule features associated with the maximum value,
        invalidating the rule when the set of rule features are absent from the plurality of rule features,
        validating the rule when the plurality of rule features comprise the set of rule features, and
        testing a first performance of the rule based on test data related to the computer program, wherein the first performance is tested when the rule is validated; and
    deploying the rule into the computer program in response to validating the rule.

2. The computer-implemented method of claim 1, wherein the testing the first performance of the rule further comprises comparing the first performance of the rule to a second performance of the rule, wherein in the second performance represents a historical performance of the rule.

3. The computer-implemented method of claim 1, wherein the testing the first performance of the rule comprises performing a regression testing of the rule.

4. The computer-implemented method of claim 1, wherein the testing the first performance of the rule comprises performing a file-wise testing of the rule.

5. A non-transitory computer-readable medium having program code recorded thereon, the program code executed by a processor and comprising:
   code to receive a plurality of conditions;
   code to receive a plurality of actions;
   code to determine, by a rule engine, a rule based on the plurality of conditions and the plurality of actions, wherein the rule operates in a computer program operationally distinct from the rule engine;
   code to dynamically validate, by the rule engine, the rule for a deployment in the computer program, wherein the code to dynamically validate the rule comprises:
      code to identify a plurality of rule features of the rule, wherein each rule feature is associated with a weighting factor comprising a value from a range of weight values, the range of weight values comprising a minimum value corresponding to a non-important rule feature and a maximum value corresponding to a required rule feature,
      code to compare the plurality of rule features to a set of rule features associated with the maximum value,
      code to invalidate the rule when the set of rule features are absent from the plurality of rule features,
      code to validate the rule when the plurality of rule features comprise the set of rule features, and
      code to test a first performance of the rule based on test data related to the computer program; and
   code to deploy the rule into the computer program in response to validating the rule.

6. The non-transitory computer-readable medium of claim 5, wherein the code to test the first performance of the rule further comprises code to compare the first performance of the rule to a second performance of the rule, wherein in the second performance represents a historical performance of the rule.

7. The non-transitory computer-readable medium of claim 5, wherein the code to test the first performance of the rule comprises code to perform a regression testing of the rule.

8. The non-transitory computer-readable medium of claim 5, wherein the code to test the first performance of the rule comprises code to perform a file-wise testing of the rule.

9. An apparatus, comprising:
   a memory; and
   at least one processor coupled to the memory, the at least one processor configured:
      to receive a plurality of conditions;
      to receive a plurality of actions;
      to determine, by a rule engine, a rule based on the plurality of conditions and the plurality of actions wherein the rule operates in a computer program operationally distinct from the rule engine;
      to dynamically validate the rule, wherein the at least one processor dynamically validates the rule by:
         identifying a plurality of rule features of the rule, wherein each rule feature is associated with a weighting factor comprising a value from a range of weight values, the range of weight values comprising a minimum value corresponding to a non-important rule feature and a maximum value corresponding to a required rule feature,
         comparing the plurality of rule features to a set of rule features associated with the maximum value,
         invalidating the rule when the set of rule features are absent from the plurality of rule features,
         validating the rule when the plurality of rule features comprise the set of rule features, and
         testing a first performance of the rule based on test data; and
      to deploy the rule into the computer program in response to validating the rule.

10. The apparatus of claim 9, wherein the at least one processor is further configured to compare the first performance of the rule to a second performance of the rule, wherein in the second performance represents a historical performance of the rule.

11. The apparatus of claim 9, wherein the at least one processor is further configured to perform a regression testing of the rule.

12. The apparatus of claim 9, wherein the at least one processor is further configured to perform a file-wise testing of the rule.

* * * * *